(12) United States Patent
Liu et al.

(10) Patent No.: US 10,630,163 B2
(45) Date of Patent: Apr. 21, 2020

(54) PULSE WIDTH MODULATION METHOD, PULSE WIDTH MODULATION SYSTEM, AND CONTROLLER

(71) Applicant: HUAWEI TECHNOLOGIES CO., LTD., Shenzhen, Guangdong (CN)

(72) Inventors: Fangcheng Liu, Shanghai (CN); Kai Xin, Shanghai (CN); Haibin Guo, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/426,171

(22) Filed: May 30, 2019

(65) Prior Publication Data
US 2019/0280609 A1 Sep. 12, 2019

Related U.S. Application Data

(63) Continuation of application No. PCT/CN2017/081600, filed on Apr. 24, 2017.

(30) Foreign Application Priority Data

Nov. 30, 2016 (CN) .......................... 2016 1 1080630

(51) Int. Cl.
*H02M 1/12* (2006.01)
*H02M 7/797* (2006.01)
(Continued)

(52) U.S. Cl.
CPC ............. *H02M 1/12* (2013.01); *H02M 7/501* (2013.01); *H02M 7/537* (2013.01);
(Continued)

(58) Field of Classification Search
CPC ............ H02M 7/42; H02M 7/44; H02M 7/53; H02M 7/53862; H02M 7/5387;
(Continued)

(56) References Cited

U.S. PATENT DOCUMENTS 5,852,558 A * 12/1998 Julian .................... H02M 1/12
363/132
6,023,417 A * 2/2000 Hava ................. H02M 7/53875
318/811

(Continued)

FOREIGN PATENT DOCUMENTS

CN 103051227 A 4/2013
CN 104753375 A 7/2015
(Continued)

OTHER PUBLICATIONS

Office Action issued in Chinese Application No. 201611080630.X dated Jul. 16, 2019, 6 pages.
(Continued)

*Primary Examiner* — Gary L Laxton
(74) *Attorney, Agent, or Firm* — Fish & Richardson P.C.

(57) ABSTRACT

A pulse width modulation method, a pulse width modulation system, and a controller are provided, which change a change rate of a common-mode component of a three-phase converter upon a change of a converter modulation degree, thereby improving stability and harmonic characteristics of the three-phase converter and implementing flexible adaptive adjustment. An example pulse width modulation method includes: obtaining initial three-phase modulation waves and a converter modulation degree; calculating a common-mode-component change-rate adjustment coefficient based on preset modulation parameters and the converter modulation degree; selecting a modulation wave having a minimum absolute value from the modulation wave set as a common-mode modulation wave; and performing waveform superposition on the initial three-phase modulation waves and the common-mode modulation wave to obtain output three-phase modulation waves.

11 Claims, 11 Drawing Sheets

(51) Int. Cl.
*H02M 7/5387* (2007.01)
*H02P 27/08* (2006.01)
*H02M 7/501* (2007.01)
*H02M 7/537* (2006.01)
*H02M 7/5395* (2006.01)

(52) U.S. Cl.
CPC ..... *H02M 7/5395* (2013.01); *H02M 7/53873* (2013.01); *H02M 7/53875* (2013.01); *H02P 27/08* (2013.01); *H02P 27/085* (2013.01)

(58) Field of Classification Search
CPC ......... H02M 7/53871; H02M 7/53875; H02M 2007/53876; H02M 7/5395; H02M 1/12; H02M 2001/123; H02M 1/14; H02M 1/143; H02M 1/15; H02M 7/66; H02M 7/79; H02M 7/797
See application file for complete search history.

(56) References Cited

U.S. PATENT DOCUMENTS 7,400,518 B2    7/2008    Yin et al.

2016/0072406 A1*    3/2016    Sato ...................... H02M 7/483
                                                         363/131

FOREIGN PATENT DOCUMENTS

| CN | 104883087 A | 9/2015 |
|----|-------------|--------|
| CN | 105207511 A | 12/2015 |
| CN | 105245123 A | 1/2016 |
| CN | 106100430 A | 11/2016 |
| JP | 5830298 B2 | 12/2015 |
| KR | 20110030304 A | 3/2011 |

OTHER PUBLICATIONS

PCT International Search Report and Written Opinion in International Application No. PCT/CN2017/081600, dated Aug. 18, 2017, 16 pages (With English translation).

Futo et al., "Empirical Compensation of Low Order Harmonics due to Flat Top Modulation: The "BATMAN" Modulator," 2015 International Conference on Electrical Drives and Power Electronics (EDPE), IEEE, Sep. 21, 2015, XP032808076, pp. 447-452.

Extended European Search Report issued in European Application No. 17875630.0 dated Oct. 21, 2019, 9 pages.

* cited by examiner

PULSE WIDTH MODULATION METHOD, PULSE WIDTH MODULATION SYSTEM, AND CONTROLLER

CROSS-REFERENCE TO RELATED APPLICATIONS

This application is a continuation of International Application No. PCT/CN2017/081600, filed on Apr. 24, 2017, which claims priority to Chinese Patent Application No. 201611080630.X, filed on Nov. 30, 2016. The disclosures of the aforementioned applications are hereby incorporated by reference in their entireties.

TECHNICAL FIELD

This application relates to the field of circuit technologies, and in particular, to a pulse width modulation method, a pulse width modulation system, and a controller.

BACKGROUND

With development of economy and society, an energy crisis gradually emerges, and a global environment gradually deteriorates. Developing and using clean alternative energy has become an important objective in the energy industry. With continuous development of new energy power generation, energy storage, and new energy vehicle industry, a converter that is used as a core energy control apparatus becomes one of key factors in clean energy application. Among a variety of converters, a three-phase converter is one of the converters that are applied most widely, and is used to connect a three-phase alternating-current power system and a direct-current power system and transfer energy between the two systems. Two working states rectification and inversion are included based on different flowing directions of energy. In inversion, energy is transferred from the direct-current system to the alternating-current system. In rectification, energy is transferred from the alternating-current system to the direct-current system. Conversion efficiency and power quality are two key technical indicators of the three-phase converter. A modulation scheme directly affects an on/off state of a switch device, and therefore is one of the key factors that affect the conversion efficiency and the power quality of the three-phase converter.

A common pulse width modulation approach in a three-phase converter is Pulse Width Modulation (PWM). To be specific, widths of driving pulses of devices in a switch network are controlled. In a most direct implementation form, a carrier is compared with a modulation wave, and a comparison result is used to control an on/off state of a switch device. PWM may further include continuous pulse width modulation (Continuous Pulse Width Modulation, CPWM) and discontinuous pulse width modulation (Discontinuous Pulse Width Modulation, DPWM). DPWM has fewer switching times than CPWM, and therefore has a lower switching loss and can improve energy conversion efficiency of the converter. However, when the modulation scheme DPWM is used, a harmonic distortion factor is generally higher than that in the scheme CPWM, and content of injected harmonics is higher, causing system resonance more easily. In addition, when the three-phase converter has a lower modulation degree, content of injected harmonics in DPWM is higher. When the three-phase converter has a relatively high modulation degree, DPWM and CPWM have close injection levels. Therefore, DPWM needs to be used to ensure energy conversion efficiency when the three-phase converter has a relatively low modulation degree. In this case, it becomes a focus of research to improve a common-mode injection method of DPWM to reduce common-mode content injected in DPWM and reduce content of harmonics generated in common-mode injection.

Two existing technologies used to reduce content of harmonics generated in common-mode injection when a three-phase converter uses DPWM are as follows: 1. A rise rate of a common-mode voltage is limited to reduce harmonics generated due to rapid change of the common-mode voltage, to equivalently extend a change time of the common-mode voltage and shorten duration of a switching state of the three-phase converter. 2. A direct current bus voltage is used as a reference object, the direct current bus voltage is measured to calculate a clamping interval of a switching transistor and a corresponding turn-on angle, and an amplitude limiting stage is added. A common-mode modulation voltage corresponding to three phases is calculated based on the direct current bus voltage, the clamping interval of the switching transistor, and phase information. A corresponding final modulation voltage is calculated based on a fundamental-frequency sinusoidal modulation voltage and the common-mode modulation voltage of the three phases.

However, in Method 1, if an amplitude-limiting value is excessively small, duration of the switching state of the three-phase converter in DPWM cannot be significantly reduced, and the advantage of efficiency improvement is reduced. If an amplitude-limiting value is excessively large, it is difficult to suppress high-frequency harmonics, and implementation is insufficiently flexible. According to actual tests, in a three-phase converter, a magnitude of a common-mode modulation voltage is not determined by a direct current bus voltage. Therefore, Method 2 is not applicable to a scenario in which a three-phase converter uses DPWM. In addition, the calculation process is relatively complex, and the calculation consumes an excessively long time. Therefore, Method 2 is not applicable to a scenario of a three-phase converter that has relatively high switching frequency.

SUMMARY

This application provides a pulse width modulation method, a pulse width modulation system, and a controller, to change a change rate of a common-mode component of a three-phase converter upon a change of a converter modulation degree, thereby improving stability and harmonic characteristics of the three-phase converter and implementing flexible adaptive adjustment.

A first aspect of the present invention provides a pulse width modulation method, where the method is applied to a three-phase converter, and includes:

obtaining initial three-phase modulation waves and a converter modulation degree;

calculating a common-mode-component change-rate adjustment coefficient based on preset modulation parameters and the converter modulation degree, where the preset modulation parameters include a preset maximum modulation degree, a preset minimum modulation degree, a preset minimum common-mode-component change rate between a positive clamping state and a negative clamping state, a preset difference between a maximum common-mode-component change rate and a minimum common-mode-component change rate between a positive clamping state and a negative clamping state, and a modulation curvature parameter of the three-phase converter;

calculating a modulation wave set corresponding to the initial three-phase modulation waves based on a preset maximum modulation-wave amplitude-limiting value, a preset minimum modulation-wave amplitude-limiting value, the initial three-phase modulation waves, and the common-mode-component change-rate adjustment coefficient, and selecting a modulation wave having a minimum absolute value from the modulation wave set as a common-mode modulation wave; and performing waveform superposition on the initial three-phase modulation waves and the common-mode modulation wave to obtain output three-phase modulation waves.

Energy transfer between a three-phase alternating-current power system and a direct-current power system is generally implemented by using a three-phase converter. If a modulation scheme of the three-phase converter is DPWM, when a converter modulation degree is relatively high, a common-mode component injected for implementing DPWM is relatively small. In this case, an output waveform approximates to a sine wave, which can satisfy both a requirement of reducing a loss and a requirement of reducing an output current distortion. In this case, a change rate of the injected common-mode component should be less limited. When the converter modulation degree gradually decreases, the common-mode component injected for implementing DPWM gradually increases. In this case, the output waveform distortion is severe, and the change rate of the injected common-mode component should be reduced. A change rate of the common-mode component is determined by the common-mode-component change-rate adjustment coefficient. The common-mode-component change-rate adjustment coefficient is calculated by using the preset modulation parameters and the converter modulation degree. The preset modulation parameters include the preset maximum modulation degree, the preset minimum modulation degree, the preset minimum common-mode-component change rate between a positive clamping state and a negative clamping state, the preset difference between a maximum common-mode-component change rate and a minimum common-mode-component change rate between a positive clamping state and a negative clamping state, and the modulation curvature parameter of the three-phase converter. The modulation wave set corresponding to the initial three-phase modulation waves is calculated based on the preset maximum modulation-wave amplitude-limiting value, the preset minimum modulation-wave amplitude-limiting value, the initial three-phase modulation waves, and the common-mode-component change-rate adjustment coefficient. The modulation wave having the minimum absolute value is selected from the modulation wave set as the common-mode modulation wave. Finally, waveform superposition is performed on the initial three-phase modulation waves and the common-mode modulation wave to obtain the output three-phase modulation waves. Compared with Method 1 in the prior art, because the change rate of the common-mode component is determined by the converter modulation degree and changes upon a change of the converter modulation degree, and there is no amplitude-limiting stage, impact caused by an inappropriate amplitude-limiting value can be avoided, and stability and harmonic characteristics of the three-phase converter are improved. Compared with 2 in the prior art, the change rate of the common-mode component is determined by the converter modulation degree, thereby implementing adaptive adjustment.

With reference to the first aspect of the present invention, in a first implementation of the first aspect of the present invention, the calculating a common-mode-component change-rate adjustment coefficient based on preset modulation parameters and the converter modulation degree includes:

obtaining the preset maximum modulation degree $M_{max}$, the preset minimum modulation degree $M_{min}$, the preset minimum common-mode-component change rate $K_b$ between a positive clamping state and a negative clamping state, the preset difference $K_a$ between a maximum common-mode-component change rate and a minimum common-mode-component change rate between a positive clamping state and a negative clamping state, and the modulation curvature parameter N of the three-phase converter, where N is greater than 0; and substituting $M_{max}$, $M_{min}$, $K_b$, $K_a$, N, and the converter modulation degree M into a formula $$K = K_a \times \left(\frac{M - M_{min}}{M_{max} - M_{min}}\right)^N + K_b$$

to calculate the common-mode-component change-rate adjustment coefficient K.

Before the solution is implemented, the modulation coefficients need to be preset. The maximum modulation degree $M_{max}$ and the minimum modulation degree $M_{min}$ are a maximum modulation degree (generally, $M_{max}$ does not exceed 1.15) and a minimum modulation degree (generally, $M_{min}$ is less than 1) that are allowed by the three-phase converter and that are determined by a product design and an application scenario of the converter. Therefore, the maximum modulation degree $M_{max}$ and the minimum modulation degree $M_{min}$ are substantially two constant values. The minimum common-mode-component change rate $K_b$ between a positive clamping state and a negative clamping state is determined by a scenario in which the three-phase converter is located, or may be freely set by a user. For the difference $K_a$ between the maximum common-mode-component change rate and $K_b$, assuming that the maximum common-mode-component change rate that is between a positive clamping state and a negative clamping state and that is allowable by the three-phase converter is 1, $K_a$ is equal to $1-K_b$. A value of the modulation curvature parameter N is preset. If N is 1, the common-mode-component change-rate adjustment coefficient and the converter modulation degree are in a linear relationship. If N is greater than 0 and is not equal to 1, the common-mode-component change-rate adjustment coefficient and the converter modulation degree are in a curved relationship. If values of M, $M_{max}$, $M_{min}$, $K_b$, $K_a$, and N are known, a value of the common-mode-component change-rate adjustment coefficient K can be calculated by using the formula. In this case, the value of K is determined by M, so that the change rate of the common-mode component is flexibly adjusted by using the converter modulation degree M.

With reference to the first implementation of the first aspect of the present invention, in a second implementation of the first aspect of the present invention, the calculating a modulation wave set corresponding to the initial three-phase modulation waves based on a preset maximum modulation-wave amplitude-limiting value, a preset minimum modulation-wave amplitude-limiting value, the initial three-phase modulation waves, and the common-mode-component change-rate adjustment coefficient, and selecting a modulation wave having a minimum absolute value from the modulation wave set as a common-mode modulation wave includes:

obtaining the preset maximum modulation-wave amplitude-limiting value $v_{max}$ and the preset minimum modulation-degree amplitude-limiting value $v_{min}$;

calculating a modulation wave set $\{v_{max}-v_a, K^*(v_{max}/2+v_{min}/2-v_a), v_{min}-v_a\}$ corresponding to $v_a$ based on $v_{max}$, $v_{min}$, the common-mode-component change-rate adjustment coefficient K, and an initial first-phase modulation wave $v_a$ of the initial three-phase modulation waves, where $v_{max}-v_a$ is a modulation wave variable in a positive clamping state corresponding to $v_a$, $v_{min}-v_a$ is a modulation wave variable in a negative clamping state corresponding to $v_a$, and $K^*(v_{max}/2+v_{min}/2-v_a)$ is a modulation wave variable in a switching state corresponding to $v_a$;

calculating a modulation wave set $\{v_{max}-v_b, K^*(v_{max}/2+v_{min}/2-v_b), v_{min}-v_b\}$ corresponding to $v_b$ based on $v_{max}$, $v_{min}$, the common-mode-component change-rate adjustment coefficient K, and an initial second-phase modulation wave $v_b$ of the initial three-phase modulation waves, where $v_{max}-v_b$ is a modulation wave variable in a positive clamping state corresponding to $v_b$, $v_{min}-v_b$ is a modulation wave variable in a negative clamping state corresponding to $v_b$, and $K^*(v_{max}/2+v_{min}/2-v_b)$ is a modulation wave variable in a switching state corresponding to $v_b$;

calculating a modulation wave set $\{v_{max}-v_c, K^*(v_{max}/2+v_{min}/2-v_c), v_{min}-v_c\}$ corresponding to $v_c$ based on $v_{max}$, $v_{min}$, the common-mode-component change-rate adjustment coefficient K, and an initial second-phase modulation wave $v_c$ of the initial three-phase modulation waves, where $v_{max}-v_c$ is a modulation wave variable in a positive clamping state corresponding to $v_c$, $v_{min}-v_c$ is a modulation wave variable in a negative clamping state corresponding to $v_c$, and $K^*(v_{max}/2+v_{min}/2-v_c)$ is a modulation wave variable in a switching state corresponding to $v_c$;

obtaining the modulation wave set $\{v_{max}-v_a, v_{max}-v_b, v_{max}-v_c, K^*(v_{max}/2+v_{min}/2-v_a), K^*(v_{max}/2+v_{min}/2-v_b), K^*(v_{max}/2+v_{min}/2-v_c), v_{min}-v_a, v_{min}-v_b, v_{min}-v_c\}$ corresponding to the initial three-phase modulation waves based on the modulation wave sets corresponding to $v_a$, $v_b$, and $v_c$; and calculating an absolute value of each modulation wave variable in the common-mode modulation wave set, and selecting a modulation wave variable having a minimum absolute value as the common-mode modulation wave.

The maximum modulation-wave amplitude-limiting value $v_{max}$ and the minimum modulation-degree amplitude-limiting value $v_{min}$ are preset. Each phase in the three-phase converter corresponds to one switch, and each switch has three clamping states. Therefore, the modulation wave set $\{v_{max}-v_a, K^*(v_{max}/2+v_{min}/2-v_a), v_{min}-v_a\}$ corresponding to $v_a$ is calculated based on $v_{max}$, $v_{min}$, the common-mode-component change-rate adjustment coefficient K, and the initial first-phase modulation wave $v_a$ of the initial three-phase modulation waves, where $v_{max}-v_a$ is the modulation wave variable in the positive clamping state corresponding to $v_a$, $v_{min}-v_a$ is the modulation wave variable in the negative clamping state corresponding to $v_a$, and $K^*(v_{max}/2+v_{min}/2-v_a)$ is the modulation wave variable in the switching state corresponding to $v_a$. The modulation wave set $\{v_{max}-v_b, K^*(v_{max}/2+v_{min}/2-v_b), v_{min}-v_b\}$ corresponding to the initial second-phase modulation wave $v_b$ and the modulation wave set $\{v_{max}-v_c, K^*(v_{max}/2+v_{min}/2-v_c), v_{min}-v_c\}$ corresponding to the initial third-phase modulation wave $v_c$ are sequentially calculated. The modulation wave sets of initial three-phase modulation waves are combined into the modulation wave set $\{v_{max}-v_a, v_{max}-v_b, v_{max}-v_c, K^*(v_{max}/2+v_{min}/2-v_a), K^*(v_{max}/2+v_{min}/2-v_b), K^*(v_{max}/2+v_{min}/2-v_c), v_{min}-v_a, v_{min}-v_b, v_{min}-v_c\}$ corresponding to the initial three-phase modulation waves, the absolute value of each modulation wave variable in the common-mode modulation wave set is calculated, and the modulation wave variable having the minimum absolute value is selected as the common-mode modulation wave.

With reference to the first aspect of the present invention, the first implementation of the first aspect, or the second implementation of the first aspect, in a third implementation of the first aspect of the present invention, the performing waveform superposition on the initial three-phase modulation waves and the common-mode modulation wave to obtain output three-phase modulation waves includes:

performing waveform superposition on an initial modulation wave of each phase of the initial three-phase modulation waves and the common-mode modulation wave in a one-to-one correspondence to obtain the output three-phase modulation waves.

After the common-mode modulation wave is obtained, the three-phase converter needs to perform waveform superposition on the initial modulation wave of each phase of the initial three-phase modulation wave and the common-mode modulation wave in a one-to-one correspondence, to obtain the output three-phase modulation waves.

With reference to the first aspect of the present invention, in a fourth implementation of the first aspect of the present invention, the obtaining initial three-phase modulation waves and a converter modulation degree includes:

obtaining three-phase grid voltages, three-phase currents, and a preset carrier amplitude value;

performing phase locking processing on the three-phase grid voltages to obtain a rotating coordinate system phase;

performing coordinate transformation on the three-phase currents based on the rotating coordinate system phase to obtain rotating coordinate system currents;

obtaining a preset current reference value for coordinate transformation of the three-phase currents, and calculating differences between the preset current reference value and the rotating coordinate system currents to obtain current differences;

processing the current differences by using PI regulators to obtain rotating coordinate system adjustment components;

performing inverse coordinate transformation on the rotating coordinate system adjustment components to obtain the initial three-phase modulation waves; and obtaining a modulation-wave amplitude value of the initial three-phase modulation waves, and obtaining the converter modulation degree based on a ratio of the modulation-wave amplitude value to the preset carrier amplitude value.

The three-phase converter is detected to obtain the three-phase grid voltages, the three-phase currents, and the preset carrier amplitude value. The three-phase grid voltages are fed into a phase-locked loop to obtain the rotating coordinate system phase. Coordinate transformation is performed on the three-phase currents based on the rotating coordinate system phase to obtain the rotating coordinate system currents. The preset current reference value for coordinate transformation of the three-phase currents is obtained. The differences between the preset current reference value and the rotating coordinate system currents are calculated to obtain the current differences. The current differences are processed by using the PI regulators to obtain the rotating coordinate system adjustment components. Inverse coordinate transformation is performed on the rotating coordinate system adjustment components to obtain the initial three-phase modulation waves. The modulation-wave amplitude value of the initial three-phase modulation waves is obtained. The converter modulation degree is obtained based on the ratio of the modulation-wave amplitude value to the preset carrier amplitude value.

A second aspect of the present invention provides a pulse width modulation system, applied to a three-phase converter, and including:

an obtaining module, configured to obtain initial three-phase modulation waves and a converter modulation degree;

a calculation module, configured to calculate a common-mode-component change-rate adjustment coefficient based on preset modulation parameters and the converter modulation degree, where the preset modulation parameters include a preset maximum modulation degree, a preset minimum modulation degree, a preset minimum common-mode-component change rate between a positive clamping state and a negative clamping state, a preset difference between a maximum common-mode-component change rate and a minimum common-mode-component change rate between a positive clamping state and a negative clamping state, and a modulation curvature parameter of the three-phase converter, where the calculation module is further configured to: calculate a modulation wave set corresponding to the initial three-phase modulation waves based on a preset maximum modulation-wave amplitude-limiting value, a preset minimum modulation-wave amplitude-limiting value, the initial three-phase modulation waves, and the common-mode-component change-rate adjustment coefficient, and select a modulation wave having a minimum absolute value from the modulation wave set as a common-mode modulation wave; and a modulation module, further configured to perform waveform superposition on the initial three-phase modulation waves and the common-mode modulation wave to obtain output three-phase modulation waves.

Energy transfer between a three-phase alternating-current power system and a direct-current power system is generally implemented by using a three-phase converter. If a modulation scheme of the three-phase converter is DPWM, when a converter modulation degree is relatively high, a common-mode component injected for implementing DPWM is relatively small. In this case, an output waveform approximates to a sine wave, which can satisfy both a requirement of reducing a loss and a requirement of reducing an output current distortion. In this case, a change rate of the injected common-mode component should be less limited. When the converter modulation degree gradually decreases, the common-mode component injected for implementing DPWM gradually increases. In this case, the output waveform distortion is severe, and the change rate of the injected common-mode component should be reduced. A change rate of the common-mode component is determined by the common-mode-component change-rate adjustment coefficient. The common-mode-component change-rate adjustment coefficient is calculated by using the preset modulation parameters and the converter modulation degree. The preset modulation parameters include the preset maximum modulation degree, the preset minimum modulation degree, the preset minimum common-mode-component change rate between a positive clamping state and a negative clamping state, the preset difference between a maximum common-mode-component change rate and a minimum common-mode-component change rate between a positive clamping state and a negative clamping state, and the modulation curvature parameter of the three-phase converter. The modulation wave set corresponding to the initial three-phase modulation waves is calculated based on the preset maximum modulation-wave amplitude-limiting value, the preset minimum modulation-wave amplitude-limiting value, the initial three-phase modulation waves, and the common-mode-component change-rate adjustment coefficient. The modulation wave having the minimum absolute value is selected from the modulation wave set as the common-mode modulation wave. Finally, waveform superposition is performed on the initial three-phase modulation waves and the common-mode modulation wave to obtain the output three-phase modulation waves. Compared with Method 1 in the prior art, because the change rate of the common-mode component is determined by the converter modulation degree and changes upon a change of the converter modulation degree, and there is no amplitude-limiting stage, impact caused by an inappropriate amplitude-limiting value can be avoided, and stability and harmonic characteristics of the three-phase converter are improved. Compared with 2 in the prior art, the change rate of the common-mode component is determined by the converter modulation degree, thereby implementing adaptive adjustment.

With reference to the second aspect of the present invention, in a first implementation of the second aspect of the present invention, the obtaining module is further configured to obtain the preset maximum modulation degree $M_{max}$, the preset minimum modulation degree $M_{min}$, the preset minimum common-mode-component change rate $K_b$ between a positive clamping state and a negative clamping state, the preset difference $K_a$ between a maximum common-mode-component change rate and a minimum common-mode-component change rate between a positive clamping state and a negative clamping state, and the modulation curvature parameter N of the three-phase converter, where N is greater than 0; and the calculation module is further configured to substitute $M_{max}$, $M_{min}$, $K_b$, $K_a$, N, and the converter modulation degree M into a formula $$K = K_a \times \left(\frac{M - M_{min}}{M_{max} - M_{min}}\right)^N + K_b$$

to calculate the common-mode-component change-rate adjustment coefficient K.

Before the solution is implemented, the modulation coefficients need to be preset. The maximum modulation degree $M_{max}$ and the minimum modulation degree $M_{min}$ are a maximum modulation degree (generally, $M_{max}$ does not exceed 1.15) and a minimum modulation degree (generally, $M_{min}$ is less than 1) that are allowed by the three-phase converter and that are determined by a product design and an application scenario of the converter. Therefore, the maximum modulation degree $M_{max}$ and the minimum modulation degree $M_{min}$ are substantially two constant values. The minimum common-mode-component change rate $K_b$ between a positive clamping state and a negative clamping state is determined by a scenario in which the three-phase converter is located, or may be freely set by a user. For the difference $K_a$ between the maximum common-mode-component change rate and $K_b$, assuming that the maximum common-mode-component change rate that is between a positive clamping state and a negative clamping state and that is allowable by the three-phase converter is 1, $K_a$ is equal to $1-K_b$. A value of the modulation curvature parameter N is preset. If N is 1, the common-mode-component change-rate adjustment coefficient and the converter modulation degree are in a linear relationship. If N is greater than 0 and is not equal to 1, the common-mode-component change-rate adjustment coefficient and the converter modulation degree are in a curved relationship. If values of M, $M_{max}$, $M_{min}$, $K_b$, $K_a$, and N are known, a value of the common-mode-component change-rate adjustment coefficient K can be calculated by using the formula. In this case, the value of K is determined by M, so that the change rate of the common-mode component is flexibly adjusted by using the converter modulation degree M.

With reference to the first implementation of the second aspect of the present invention, in a second implementation of the second aspect of the present invention, the obtaining module is further configured to obtain the preset maximum modulation-wave amplitude-limiting value $v_{max}$ and the preset minimum modulation-degree amplitude-limiting value $v_{min}$;

the calculation module is further configured to calculate a modulation wave set $\{v_{max}-v_a, K^*(v_{max}/2+v_{min}/2-v_a), v_{min}-v_a\}$ corresponding to $v_a$ based on $v_{max}$, $v_{min}$, the common-mode-component change-rate adjustment coefficient K, and an initial first-phase modulation wave $v_a$ of the initial three-phase modulation waves, where $v_{max}-v_a$ is a modulation wave variable in a positive clamping state corresponding to $v_a$, $v_{min}-v_a$ is a modulation wave variable in a negative clamping state corresponding to $v_a$, and $K^*(v_{max}/2+v_{min}/2-v_a)$ is a modulation wave variable in a switching state corresponding to $v_a$;

the calculation module is further configured to calculate a modulation wave set $\{v_{max}-v_b, K^*(v_{max}/2+v_{min}/2-v_b), v_{min}-v_b\}$ corresponding to $v_b$ based on $v_{max}$, $v_{min}$, the common-mode-component change-rate adjustment coefficient K, and an initial second-phase modulation wave $v_b$ of the initial three-phase modulation waves, where $v_{max}-v_b$ is a modulation wave variable in a positive clamping state corresponding to $v_b$, $v_{min}-v_b$ is a modulation wave variable in a negative clamping state corresponding to $v_b$, and $K^*(v_{max}/2+v_{min}/2-v_b)$ is a modulation wave variable in a switching state corresponding to $v_b$;

the calculation module is further configured to calculate a modulation wave set $\{v_{max}-v_c, K^*(v_{max}/2+v_{min}/2-v_c), v_{min}-v_c\}$ corresponding to $v_c$ based on $v_{max}$, $v_{min}$, the common-mode-component change-rate adjustment coefficient K, and an initial second-phase modulation wave $v_c$ of the initial three-phase modulation waves, where $v_{max}-v_c$ is a modulation wave variable in a positive clamping state corresponding to $v_c$, $v_{min}-v_c$ is a modulation wave variable in a negative clamping state corresponding to $v_c$, and $K^*(v_{max}/2+v_{min}/2-v_c)$ is a modulation wave variable in a switching state corresponding to $v_c$;

the calculation module is further configured to obtain the modulation wave set $\{v_{max}-v_a, v_{max}-v_b, v_{max}-v_c, K^*(v_{max}/2+v_{min}/2-v_a), K^*(v_{max}/2+v_{min}/2-v_b), K^*(v_{max}/2+v_{min}/2-v_c), v_{min}-v_a, v_{min}-v_b, v_{min}-v_c\}$ corresponding to the initial three-phase modulation waves based on the modulation wave sets corresponding to $v_a$, $v_b$, and $v_c$; and the calculation module is further configured to: calculate an absolute value of each modulation wave variable in the common-mode modulation wave set, and select a modulation wave variable having a minimum absolute value as the common-mode modulation wave.

The maximum modulation-wave amplitude-limiting value $v_{max}$ and the minimum modulation-degree amplitude-limiting value $v_{min}$ are preset. Each phase in the three-phase converter corresponds to one switch, and each switch has three clamping states. Therefore, the modulation wave set $\{v_{max}-v_a, K^*(v_{max}/2+v_{min}/2-v_a), v_{min}-v_a\}$ corresponding to $v_a$ is calculated based on $v_{max}$, $v_{min}$, the common-mode-component change-rate adjustment coefficient K, and the initial first-phase modulation wave $v_a$ of the initial three-phase modulation waves, where $v_{max}-v_a$ is the modulation wave variable in the positive clamping state corresponding to $v_a$, $v_{min}-v_a$ is the modulation wave variable in the negative clamping state corresponding to $v_a$, and $K^*(v_{max}/2+v_{min}/2-v_a)$ is the modulation wave variable in the switching state corresponding to $v_a$. The modulation wave set $\{v_{max}-v_b, K^*(v_{max}/2+v_{min}/2-v_b), v_{min}-v_b\}$ corresponding to the initial second-phase modulation wave $v_b$ and the modulation wave set $\{v_{max}-v_b, K^*(v_{max}/2+v_{min}/2-v_b), v_{min}-v_b\}$ corresponding to the initial third-phase modulation wave $v_b$ are sequentially calculated. The modulation wave sets of initial three-phase modulation waves are combined into the modulation wave set $\{v_{max}-v_a, v_{max}-v_b, v_{max}-v_c, K^*(v_{max}/2+v_{min}/2-v_a), K^*(v_{max}/2+v_{min}/2-v_b), K^*(v_{max}/2+v_{min}/2-v_c), v_{min}-v_a, v_{min}-v_b, v_{min}-v_c\}$ corresponding to the initial three-phase modulation waves, the absolute value of each modulation wave variable in the common-mode modulation wave set is calculated, and the modulation wave variable having the minimum absolute value is selected as the common-mode modulation wave.

With reference to the second aspect of the present invention, the first implementation of the second aspect, or the second implementation of the second aspect, in a third implementation of the second aspect of the present invention, the modulation module is specifically configured to perform waveform superposition on an initial modulation wave of each phase of the initial three-phase modulation waves and the common-mode modulation wave in a one-to-one correspondence to obtain the output three-phase modulation waves.

After the common-mode modulation wave is obtained, the three-phase converter needs to perform waveform superposition on the initial modulation wave of each phase of the common-mode modulation wave and the common-mode modulation wave in a one-to-one correspondence, to obtain the output three-phase modulation waves.

With reference to the second aspect of the present invention, in a fourth implementation of the second aspect of the present invention, the obtaining module is configured to obtain three-phase grid voltages, three-phase currents, and a preset carrier amplitude value;

the calculation module is further configured to perform phase locking processing on the three-phase grid voltages to obtain a rotating coordinate system phase;

the calculation module is further configured to perform coordinate transformation on the three-phase currents based on the rotating coordinate system phase to obtain rotating coordinate system currents;

the obtaining module is further configured to: obtain a preset current reference value for coordinate transformation of the three-phase currents, and calculate differences between the preset current reference value and the rotating coordinate system currents to obtain current differences;

the calculation module is further configured to process the current differences by using proportional-integral PI regulators to obtain rotating coordinate system adjustment components;

the calculation module is further configured to perform inverse coordinate transformation on the rotating coordinate system adjustment components to obtain the initial three-phase modulation waves; and the calculation module is further configured to: obtain a modulation-wave amplitude value of the initial three-phase modulation waves, and obtain the converter modulation degree based on a ratio of the modulation-wave amplitude value to the preset carrier amplitude value.

The obtaining module detects the three-phase converter to obtain the three-phase grid voltages, the three-phase currents, and the preset carrier amplitude value. The calculation module feeds the three-phase grid voltages into a phase-locked loop to obtain the rotating coordinate system phase, performs coordinate transformation on the three-phase currents based on the rotating coordinate system phase to obtain the rotating coordinate system currents, obtains the preset current reference value for coordinate transformation of the three-phase currents, calculates the differences between the preset current reference value and the rotating coordinate system currents to obtain the current differences, processes the current differences by using the PI regulators to obtain the rotating coordinate system adjustment components, performs inverse coordinate transformation on the rotating coordinate system adjustment components to obtain the initial three-phase modulation waves, obtains the modulation-wave amplitude value of the initial three-phase modulation waves, and obtains the converter modulation degree based on the ratio of the modulation-wave amplitude value to the preset carrier amplitude value.

A third aspect of the present invention provides a controller, applied to a three-phase converter, and including:

a processor, a memory, and a signal interface connected to each other, where the memory stores an operation instruction of the processor;

the signal interface is configured to obtain initial three-phase modulation waves and a converter modulation degree;

the processor is configured to calculate a common-mode-component change-rate adjustment coefficient based on preset modulation parameters and the converter modulation degree, where the preset modulation parameters include a preset maximum modulation degree, a preset minimum modulation degree, a preset minimum common-mode-component change rate between a positive clamping state and a negative clamping state, a preset difference between a maximum common-mode-component change rate and a minimum common-mode-component change rate between a positive clamping state and a negative clamping state, and a modulation curvature parameter of the three-phase converter;

the processor is further configured to: calculate a modulation wave set corresponding to the initial three-phase modulation waves based on a preset maximum modulation-wave amplitude-limiting value, a preset minimum modulation-wave amplitude-limiting value, the initial three-phase modulation waves, and the common-mode-component change-rate adjustment coefficient, and select a modulation wave having a minimum absolute value from the modulation wave set as a common-mode modulation wave; and the processor is further configured to perform waveform superposition on the initial three-phase modulation waves and the common-mode modulation wave to obtain output three-phase modulation waves.

The common-mode-component change-rate adjustment coefficient is calculated by the processor based on the preset modulation parameters and the converter modulation degree. The preset modulation parameters include the preset maximum modulation degree, the preset minimum modulation degree, the preset minimum common-mode-component change rate between a positive clamping state and a negative clamping state, the preset difference between a maximum common-mode-component change rate and a minimum common-mode-component change rate between a positive clamping state and a negative clamping state, and the modulation curvature parameter of the three-phase converter. The modulation wave set corresponding to the initial three-phase modulation waves is calculated based on the preset maximum modulation-wave amplitude-limiting value, the preset minimum modulation-wave amplitude-limiting value, the initial three-phase modulation waves, and the common-mode-component change-rate adjustment coefficient. The modulation wave having the minimum absolute value is selected from the modulation wave set as the common-mode modulation wave. Finally, waveform superposition is performed on the initial three-phase modulation waves and the common-mode modulation wave to obtain the output three-phase modulation waves. Compared with Method 1 in the prior art, because the change rate of the common-mode component is determined by the converter modulation degree and changes upon a change of the converter modulation degree, and there is no amplitude-limiting stage, impact caused by an inappropriate amplitude-limiting value can be avoided, and stability and harmonic characteristics of the three-phase converter are improved. Compared with 2 in the prior art, the change rate of the common-mode component is determined by the converter modulation degree, thereby implementing adaptive adjustment.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

This application provides a pulse width modulation method, a pulse width modulation system, and a controller, to change a change rate of a common-mode component of a three-phase converter upon a change of a converter modulation degree, thereby improving stability and harmonic characteristics of the three-phase converter and implementing flexible adaptive adjustment.

The following clearly describes the technical solutions in the embodiments of this application with reference to the accompanying drawings in the embodiments of this application. Apparently, the described embodiments are merely some rather than all of the embodiments of the present invention.

A system architecture or scenario to which the present invention is applied is briefly described first.

Figure 1:
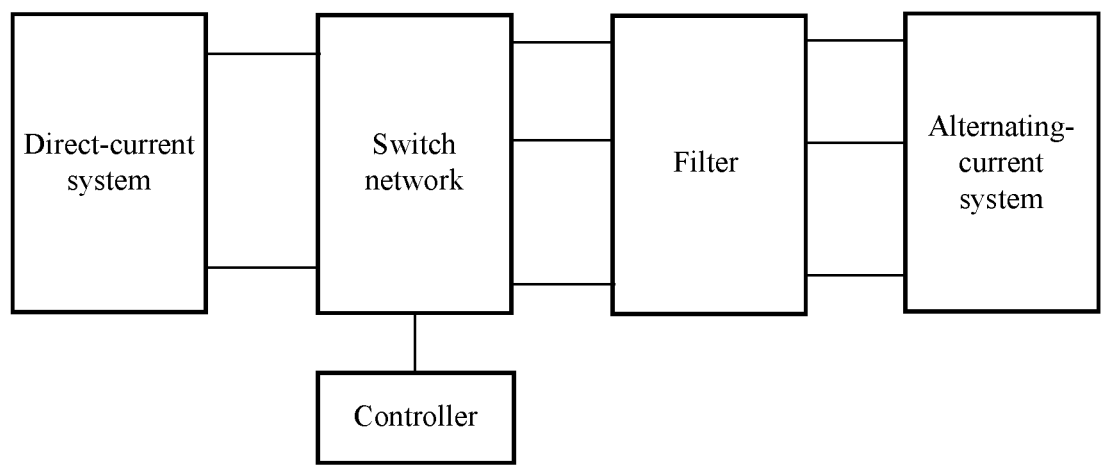
FIG. 1 is a system structure diagram of a three-phase converter according to this application.

The present invention is applied to a converter, and particularly, to a three-phase converter that is applied most widely at present. The three-phase converter is configured to connect a three-phase alternating-current power system and a direct-current power system and implement energy transfer between the two systems. Two working states: rectification and inversion are included based on different flowing directions of energy. In inversion, energy is transferred from the direct-current system to the alternating-current system. In rectification, energy is transferred from the alternating-current system to the direct-current system. Therefore, in most application scenarios, both rectification and inversion may be implemented by using a same system. A typical system structure of the three-phase converter is shown in FIG. 1 and includes a direct-current system, a switch network, a controller, a filter, and an alternating-current system. The filter is configured to filter alternating current during rectification. The switch network includes switch devices. The controller controls, in a modulation scheme, the switch devices in the switch network to be closed or open to turn on or off energy transfer between the alternating-current system and the direct-current system.

A pulse width modulation approach used in the three-phase converter is PWM. To be specific, widths of driving pulses of the devices in the switch network are controlled. In a most direct implementation form, a carrier is compared with a modulation wave, and a comparison result is used to control an on/off state of a switch device. PWM may further include CPWM and DPWM. CPWM means that a bridge arm of each phase always has one switching action within each switching period. A common scheme is sinusoidal pulse width modulation (Sinusoidal Pulse Width Modulation, SPWM). DPWM means that within a specific switching period, a bridge arm of a phase of the converter is clamped to a positive direct current bus or a negative direct current bus. Within the clamping interval, a switch device of the phase is normally closed or normally open and no switching action occurs. Common DPWM modulation includes schemes such as DPWM0, DPWM1, DPWM2, DPWM3, DPWMMAX, DPWMMIN, and GDPWM (General DPWM).

Figure 2:
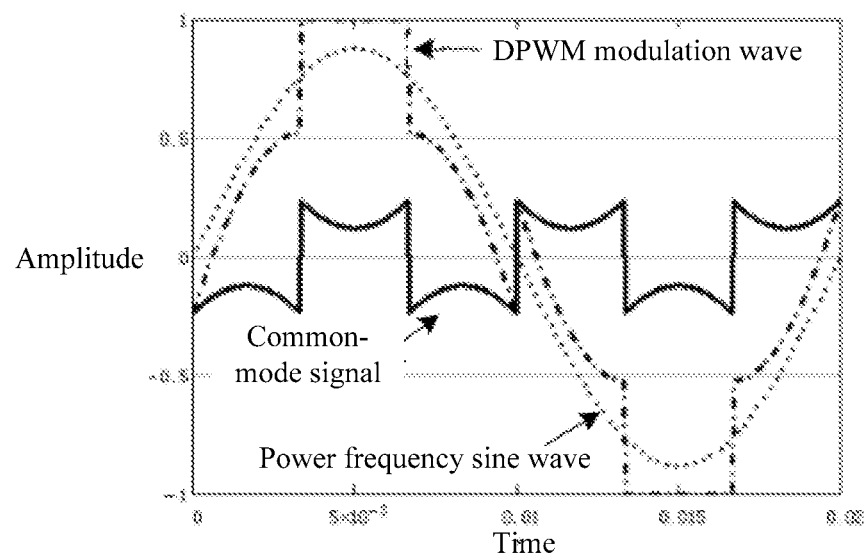
FIG. 2 is a schematic waveform diagram of a common-mode signal according to this application.
Figure 3:
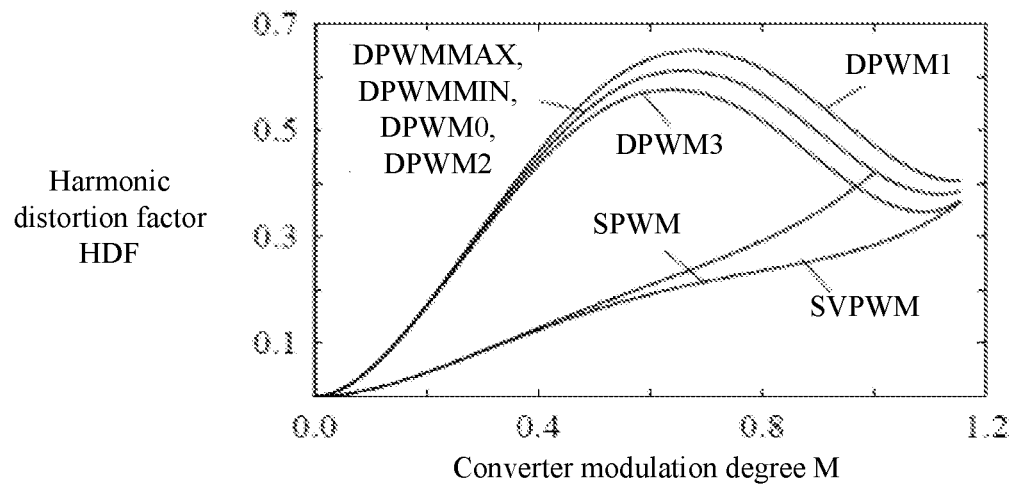
FIG. 3 is a diagram showing a curved relationship between a converter modulation degree and a harmonic distortion factor according to this application.

During specific implementation, a DPWM modulation wave may be implemented by superposing an equivalent common-mode component on a CPWM modulation wave. For example, a DPWM modulation waveform is compared with an SPWM (a type of CPWM) modulation waveform within a power frequency period (for example, 50 Hz). As shown in FIG. 2, a difference between a DPWM modulation wave and a power frequency sine wave is a waveform of a common-mode signal in FIG. 2. The DPWM modulation wave may be equal to a sum of an SPWM modulation wave and a common-mode signal. Therefore, a DPWM output characteristic is affected by both an SPWM output characteristic and a common-mode signal output characteristic. An injected common-mode signal affects power quality of the converter or even causes resonance, resulting in impact on system stability. FIG. 3 is a diagram showing a relationship curve between a converter modulation degree M and a harmonic distortion factor HDF in a common modulation scheme PWM. As can be learned in FIG. 3, a harmonic distortion factor in the modulation scheme DPWM is generally higher than that in the scheme CPWM. However, when a modulation degree is relatively high, DPWM and CPWM have relatively close harmonic distortion factors. In this case, an injected common-mode signal component is relatively small in DPWM modulation. When a modulation degree is relatively low, an injected common-mode signal component is relatively large to implement clamping. In this case, a harmonic distortion factor of DPWM is much larger than that of CPWM. Therefore, common-mode injection in DPWM when a modulation degree is low needs to be improved, to reduce common-mode content injected in DPWM and reduce content of harmonics generated in common-mode injection.

Figure 4:
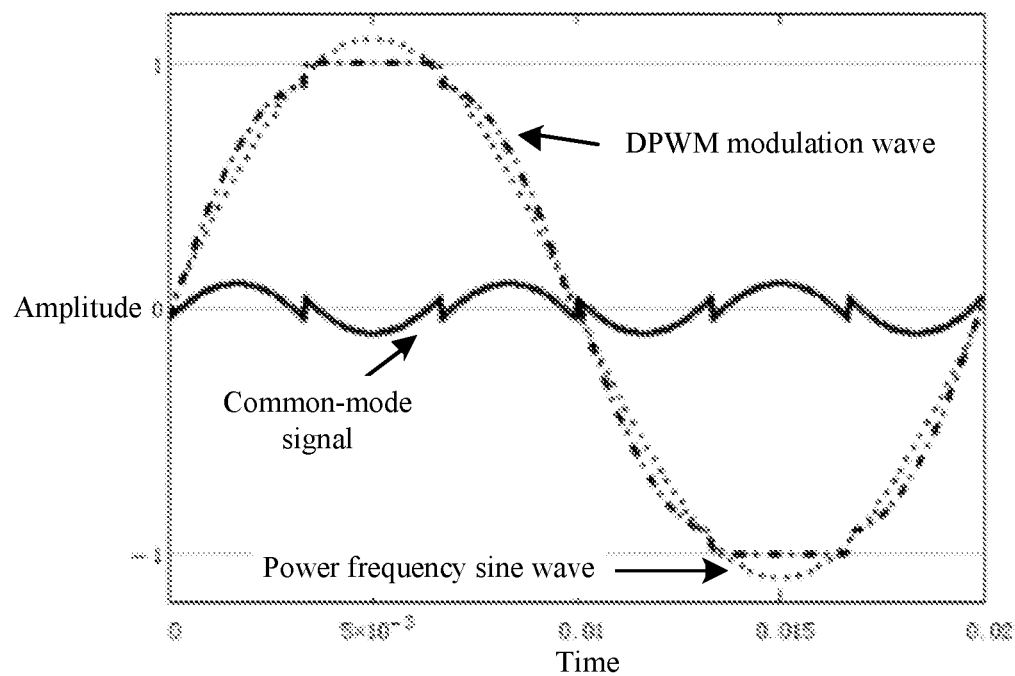
FIG. 4 is a schematic waveform diagram of a DPWM modulation wave when a converter modulation degree M=1.1 according to this application.
Figure 5:
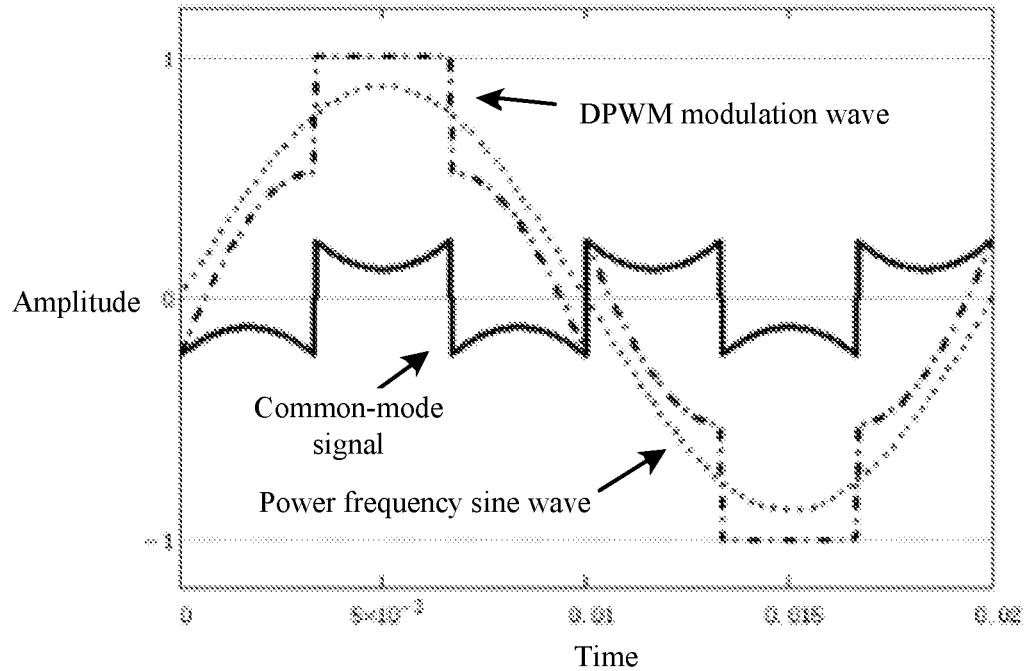
FIG. 5 is a schematic waveform diagram of a DPWM modulation wave when a converter modulation degree M=0.88 according to this application.

It can be learned based on existing researches that when the converter modulation degree is relatively large, a common-mode signal injected to implement DPWM is relatively small. FIG. 4 is a schematic diagram of a DPWM modulation wave when a converter modulation degree M=1.1. In this case, a common-mode signal injected to implement DPWM is relatively small, an output waveform approximates to a sine wave, and an output current distortion is small. In this case, conventional DPWM modulation should be used, and a change rate of an injected common-mode component should be less limited. When the converter modulation degree is relatively small, a common-mode signal injected to implement DPWM is relatively large. FIG. 5 is a schematic diagram of a DPWM modulation wave when a converter modulation degree M=0.88. In this case, an output waveform distortion is severe, and a change rate of an injected common-mode component should be reduced, so that a high-frequency component of the common-mode component is reduced, and impact of a drastic change of the common-mode component on the converter and a current distortion are reduced.

In a current DPWM solution, the three-phase converter has three bridge arms. Each bridge arm can generate three states: a positive clamping state, a negative clamping state, and a switching state. A total of nine states of the three bridge arms correspond to nine modulation waves. However, the three-phase converter can implement only one clamping state at any moment, or otherwise the converter is out of control. Therefore, the three-phase converter may have three clamping states: a positive clamping state, a negative clamping state, and a switching state. Based on analysis, switching improves efficiency of the three-phase converter much more than positive clamping and negative clamping. In addition, because the switching state is a transition state between the positive clamping state and the negative clamping state, a component of a common-mode voltage in the switching state directly affects a common-mode component that is eventually superposed.

Figure 6:
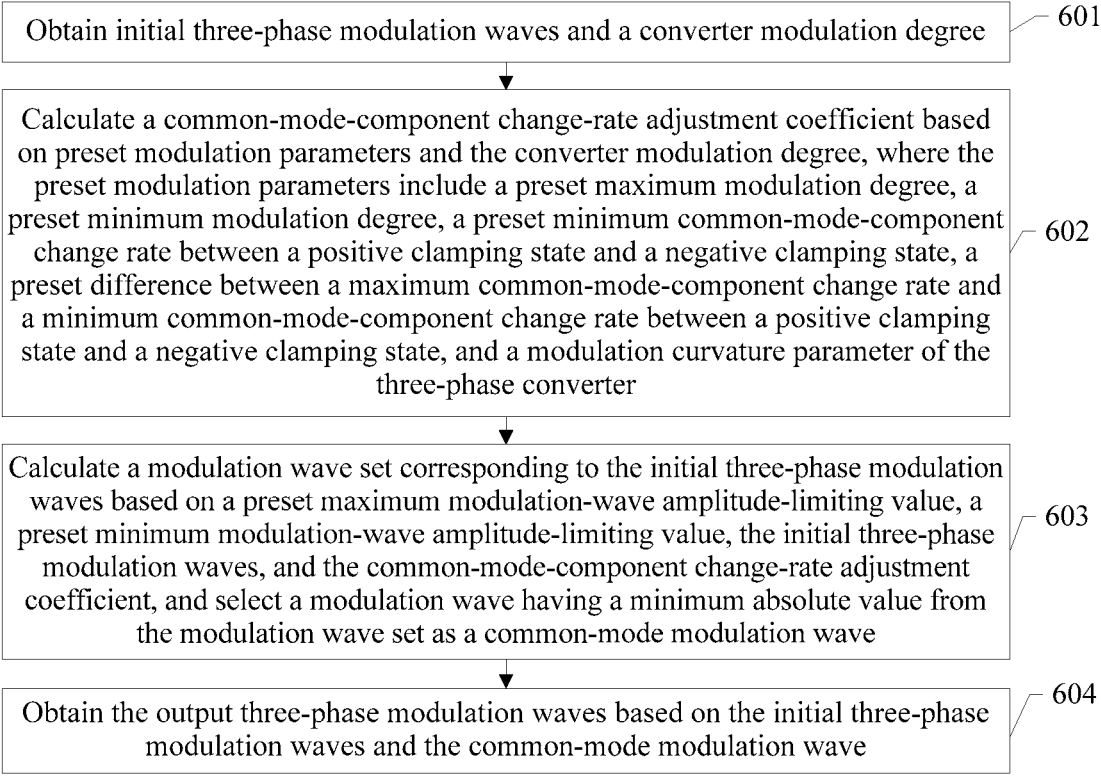
FIG. 6 is a schematic flowchart of an embodiment of a pulse width modulation method according to this application.

The present invention provides a pulse width modulation method to resolve impact of a common-mode component in a switching state on a three-phase converter, and details are as follows:

Referring to FIG. 6, an embodiment of the present invention provides a pulse width modulation method, including the following steps.

601: Obtain initial three-phase modulation waves and a converter modulation degree.

In this embodiment, the initial three-phase modulation waves are initial modulation waves of all phases in a control loop of a three-phase converter. The control loop includes one or a combination of a voltage control loop, a current control loop, or a power control loop. The converter modulation degree may be obtained by calculating a ratio of an alternating-current voltage-phase peak to a direct current voltage of the converter, or obtained by calculating peaks of the initial three-phase modulation waves and carrier peaks. The three-phase converter adjusts a modulation wave to control a voltage and a current of the converter. Therefore, a modulation wave changes dynamically. When the converter enters a stable operation state, the modulation wave is repeated periodically. In this case, a peak of the modulation wave may be considered as a constant value. Therefore, the converter modulation degree can be accurately obtained.

602: Calculate a common-mode-component change-rate adjustment coefficient based on preset modulation parameters and the converter modulation degree.

In this embodiment, the preset modulation parameters include a preset maximum modulation degree, a preset minimum modulation degree, a preset minimum common-mode-component change rate between a positive clamping state and a negative clamping state, a preset difference between a maximum common-mode-component change rate and a minimum common-mode-component change rate between a positive clamping state and a negative clamping state, and a modulation curvature parameter of the three-phase converter. The preset maximum modulation degree and the preset minimum modulation degree are determined by a product design and an application scenario of the three-phase converter. The preset minimum common-mode-component change rate between a positive clamping state and a negative clamping state and the preset difference between a maximum common-mode-component change rate and a minimum common-mode-component change rate between a positive clamping state and a negative clamping state are determined by a scenario in which the three-phase converter is located, or may be freely set by a user. The modulation curvature parameter is also preset. Therefore, before the solution is implemented, values of the preset modulation parameters are known. The common-mode-component change-rate adjustment coefficient is calculated based on the preset modulation parameters and the converter modulation degree. The common-mode-component change-rate adjustment coefficient is used to indicate a change rate of a common-mode component. When the common-mode-component change-rate adjustment coefficient has a larger value, it indicates that the change rate of the common-mode component is higher.

603: Calculate a modulation wave set corresponding to the initial three-phase modulation waves based on a preset maximum modulation-wave amplitude-limiting value, a preset minimum modulation-wave amplitude-limiting value, the initial three-phase modulation waves, and the common-mode-component change-rate adjustment coefficient, and select a modulation wave having a minimum absolute value from the modulation wave set as a common-mode modulation wave.

In this embodiment, the maximum modulation-wave amplitude-limiting value and the minimum modulation-degree amplitude-limiting value are preset. Each phase in the three-phase converter corresponds to one switch, and each switch has three clamping states. Therefore, modulation waves in three clamping states may be correspondingly obtained for a modulation wave of each phase of the initial three-phase modulation waves. Therefore, the calculated modulation wave set corresponding to the initial three-phase modulation waves includes nine modulation waves, and the modulation wave having the minimum absolute value is selected from the nine modulation waves in the modulation wave set as the common-mode modulation wave.

604: Perform waveform superposition on the initial three-phase modulation waves and the common-mode modulation wave to obtain output three-phase modulation waves.

In this embodiment, waveform superposition is performed on the initial three-phase modulation waves and the common-mode modulation wave to obtain corresponding output three-phase modulation waves. It can be observed from a waveform distortion of the output three-phase modulation waves that the converter modulation degree is directly proportional to the change rate of the common-mode component.

In this embodiment of the present invention, a change rate of the common-mode component is determined by the common-mode-component change-rate adjustment coefficient. The common-mode-component change-rate adjustment coefficient is calculated by using the preset modulation parameters and the converter modulation degree. The preset modulation parameters include the preset maximum modulation degree, the preset minimum modulation degree, the preset minimum common-mode-component change rate between a positive clamping state and a negative clamping state, the preset difference between a maximum common-mode-component change rate and a minimum common-mode-component change rate between a positive clamping state and a negative clamping state, and the modulation curvature parameter of the three-phase converter. The modulation wave set corresponding to the initial three-phase modulation waves is calculated based on the preset maximum modulation-wave amplitude-limiting value, the preset minimum modulation-wave amplitude-limiting value, the initial three-phase modulation waves, and the common-mode-component change-rate adjustment coefficient. The modulation wave having the minimum absolute value is selected from the modulation wave set as the common-mode modulation wave. Finally, waveform superposition is performed on the initial three-phase modulation waves and the common-mode modulation wave to obtain the output three-phase modulation waves. Compared with Method 1 in the prior art, because the change rate of the common-mode component is determined by the converter modulation degree and changes upon a change of the converter modulation degree, and there is no amplitude-limiting stage, impact caused by an inappropriate amplitude-limiting value can be avoided, and stability and harmonic characteristics of the three-phase converter are improved. Compared with 2 in the prior art, the change rate of the common-mode component is determined by the converter modulation degree, thereby implementing adaptive adjustment.

Figure 7:
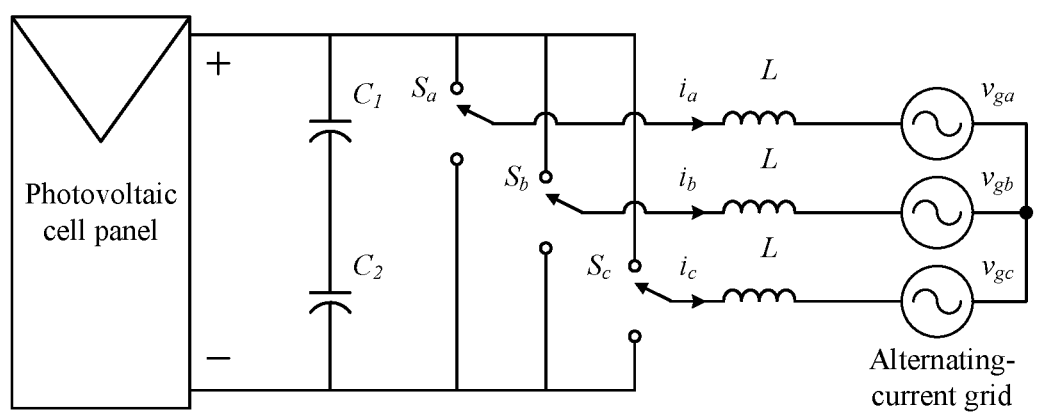
FIG. 7 is a schematic structural diagram of a three-level grid-connected photovoltaic inverter according to this application.
Figure 8:
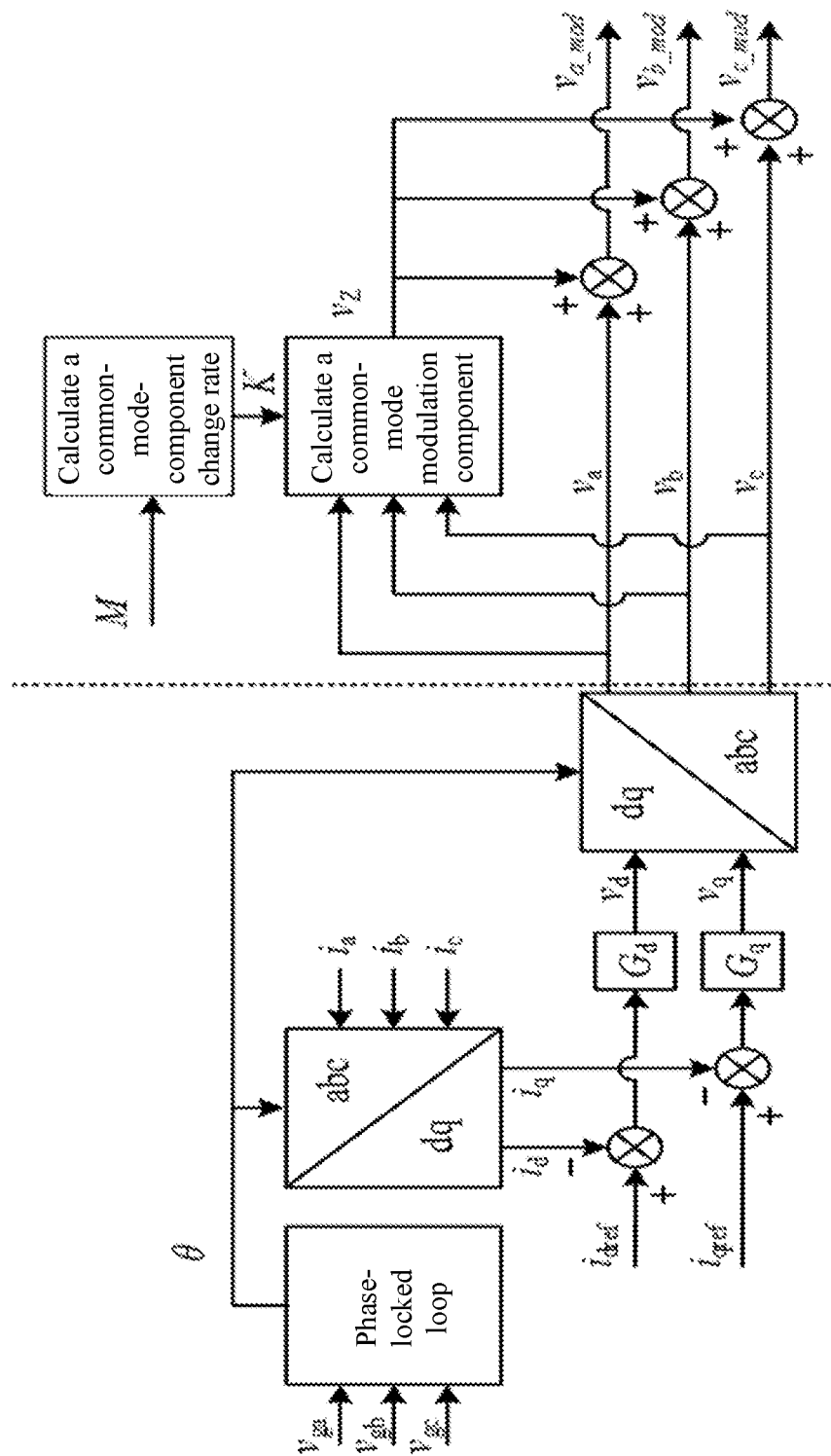
FIG. 8 is a schematic diagram of a control algorithm of a three-level grid-connected photovoltaic inverter according to this application.

The three-phase converter may include an inverter state and a rectifier state. The solution in the present invention may be applied to an inverter or a rectifier. A photovoltaic inverter application system shown in FIG. 7 is used as an example. An inverter structure is a two-level structure, a direct current bus is connected to a photovoltaic cell panel, and an alternating-current port is connected to a three-phase alternating-current grid by using an L filter. It is defined in a control system that a positive direction of a current is a direction of flowing out from a bridge arm port of the inverter. FIG. 8 is a diagram showing an algorithm of the inverter.

Optionally, in some embodiments of the present invention, the obtaining initial three-phase modulation waves and a converter modulation degree includes:

obtaining three-phase grid voltages, three-phase currents, and a preset carrier amplitude value;

performing phase locking processing on the three-phase grid voltages to obtain a rotating coordinate system phase;

performing coordinate transformation on the three-phase currents based on the rotating coordinate system phase to obtain rotating coordinate system currents;

obtaining a preset current reference value for coordinate transformation of the three-phase currents, and calculating differences between the preset current reference value and the rotating coordinate system currents to obtain current differences;

processing the current differences by using PI regulators to obtain rotating coordinate system adjustment components;

performing inverse coordinate transformation on the rotating coordinate system adjustment components to obtain the initial three-phase modulation waves; and obtaining a modulation-wave amplitude value of the initial three-phase modulation waves, and obtaining the converter modulation degree based on a ratio of the modulation-wave amplitude value to the preset carrier amplitude value.

In this embodiment of the present invention, the three-phase grid voltages $v_{ga}$, $v_{gb}$, and $v_{gc}$, the three-phase currents $i_a$, $i_b$, and $i_c$, and the converter modulation degree M are obtained with reference to a photovoltaic inverter shown in FIG. 8. The three-phase grid voltages $v_{ga}$, $v_{gb}$, and $v_{gc}$ are first fed into a phase-locked loop (PLL) to obtain the rotating coordinate system phase θ. Coordinate transformation is then performed on the three-phase currents $i_a$, $i_b$, and $i_c$ to obtain the rotating coordinate system currents $i_d$ and $i_q$ of the three-phase currents $i_a$, $i_b$, and $i_c$. A calculation method of coordinate transformation is Park transformation (Park Transformation). A calculation equation of the calculation method is:

$$\begin{bmatrix} i_d \\ i_q \end{bmatrix} = \begin{bmatrix} \cos(\theta) & \cos\left(\theta - \frac{2\pi}{3}\right) & \cos\left(\theta + \frac{2\pi}{3}\right) \\ -\sin(\theta) & -\sin\left(\theta - \frac{2\pi}{3}\right) & -\sin\left(\theta + \frac{2\pi}{3}\right) \end{bmatrix} \cdot \begin{bmatrix} i_a \\ i_b \\ i_c \end{bmatrix}.$$

The calculated $i_d$ and $i_q$ are compared with reference values $i_{dref}$ and $i_{qref}$ of $i_d$ and $i_q$, and differences obtained through comparison are respectively fed into regulators $G_d$ and $G_q$ to obtain rotating coordinate system adjustment components $v_d$ and $v_q$ on a d axis and a q axis, where $G_d$ and $G_q$ are both proportional-integral (Proportional-Integral, PI) regulators.

Inverse coordinate transformation is performed on the adjustment components $v_d$ and $v_q$ to obtain equivalent values $v_a$, $v_b$, and $v_c$ of the adjustment components $v_d$ and $v_q$ in a stationary coordinate system. A calculation method is inverse Park transformation (Inverse Park Transformation). A calculation equation of the calculation method is:

$$\begin{bmatrix} v_a \\ v_b \\ v_c \end{bmatrix} = \begin{bmatrix} \cos(\theta) & -\sin(\theta) \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \cdot \begin{bmatrix} v_d \\ v_q \end{bmatrix}.$$

An inverter modulation degree is obtained based on a ratio of a modulation-wave amplitude value of the initial three-phase modulation waves $v_a$, $v_b$, and $v_c$ to the preset carrier amplitude value. The inverter modulation degree is the converter modulation degree.

It should be noted that the foregoing embodiment in which the initial three-phase modulation waves are obtained based on coordinate transformation of the three-phase grid voltages and the three-phase currents is only a manner for obtaining initial modulation waves. During actual application, another manner may be used. This is not specifically limited.

Optionally, in some embodiments of the present invention, the calculating a common-mode-component change-rate adjustment coefficient based on preset modulation coefficients and the converter modulation degree includes:

obtaining the preset maximum modulation degree $M_{max}$, the preset minimum modulation degree $M_{min}$, the preset minimum common-mode-component change rate $K_b$ between a positive clamping state and a negative clamping state, the preset difference $K_a$ between a maximum common-mode-component change rate and a minimum common-mode-component change rate between a positive clamping state and a negative clamping state, and the modulation curvature parameter N of the three-phase converter, where N is greater than 0; and substituting $M_{max}$, $M_{min}$, $K_b$, $K_a$, N, and the converter modulation degree M into a formula $$K = K_a \times \left(\frac{M - M_{min}}{M_{max} - M_{min}}\right)^N + K_b$$

to calculate the common-mode-component change-rate adjustment coefficient K.

In this embodiment of the present invention, the formula for calculating the common-mode-component change-rate adjustment coefficient K based on the converter modulation degree M and the preset modulation coefficients is:

$$K = K_a \times \left(\frac{M - M_{min}}{M_{max} - M_{min}}\right)^N + K_b,$$

where the maximum modulation degree $M_{max}$ and the minimum modulation degree $M_{min}$ are a maximum modulation degree (generally, $M_{max}$ does not exceed 1.15) and a minimum modulation degree (generally, $M_{min}$ is less than 1) that are allowed by the three-phase converter and that are determined by a product design and an application scenario of the converter. Therefore, the maximum modulation degree $M_{max}$ and the minimum modulation degree $M_{min}$ are substantially two constant values. The minimum common-mode-component change rate $K_b$ between a positive clamping state and a negative clamping state is determined by a scenario in which the three-phase converter is located, or may be freely set by a user. For the difference $K_a$ between the maximum common-mode-component change rate and $K_b$, assuming that the maximum common-mode-component change rate that is between a positive clamping state and a negative clamping state and that is allowable by the three-phase converter is 1, $K_a$ is equal to $1-K_b$. A value of the modulation curvature parameter N is preset. If N is 1, the common-mode-component change-rate adjustment coefficient and the converter modulation degree are in a curved relationship If N is greater than 0 and is not equal to 1, it is preset that a common-mode component adjustment formula is a curve equation. If values of M, $M_{max}$, $M_{min}$, $K_b$, $K_a$, and N are obtained, a value of the common-mode-component change-rate adjustment coefficient K can be calculated by using the formula. The values of $M_{max}$, $M_{min}$, $K_b$, $K_a$, and N are all preset and adjustable. In this case, the value of K is determined by M, so that the change rate of the common-mode component is flexibly adjusted by using the converter modulation degree M.

It is assumed that $M_{max}$ is 1.15, $M_{min}$ is 0.8, N is 1, and $K_a$ and $K_b$ are both 0.5. In this case, the common-mode-component change-rate adjustment coefficient K may be calculated based on M. A mathematical relationship between M and K is:

$$K = 0.5 \times \left( \frac{M - 0.8}{1.15 - 0.8} \right) + 0.5.$$

Figure 9:
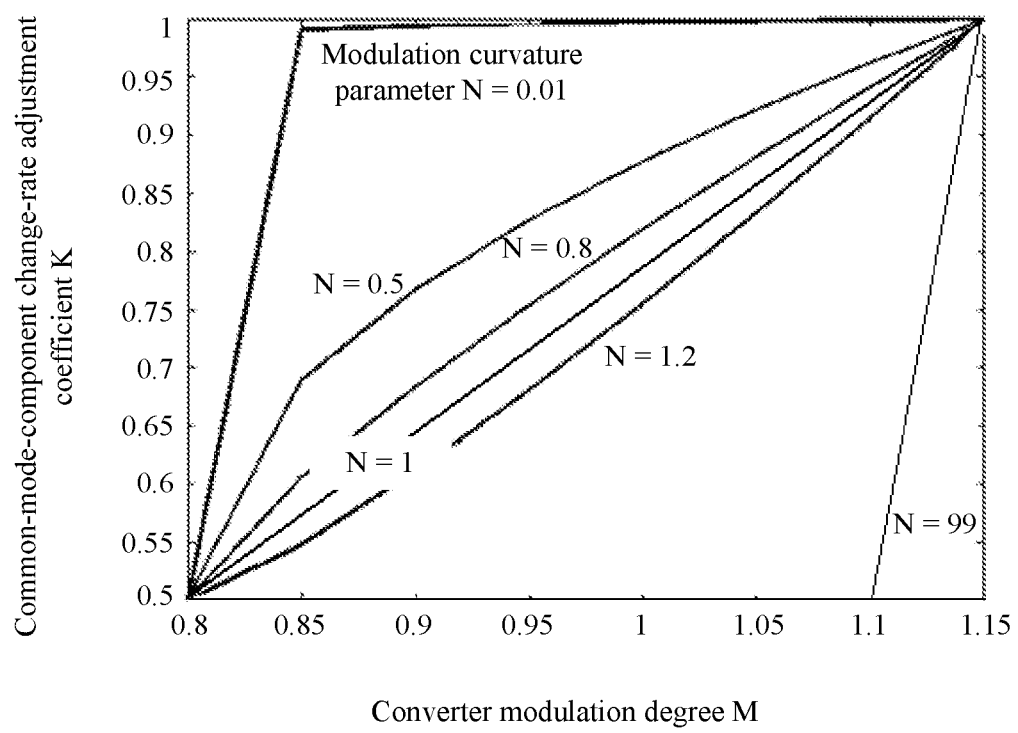
FIG. 9 is a diagram showing a relationship between a modulation curvature parameter, a converter modulation degree, and a common-mode-component change-rate adjustment coefficient according to this application.

A diagram of the obtained relationship between the converter modulation degree M and the common-mode-component change-rate adjustment coefficient K is a straight line of N=1 shown in FIG. 9. Specifically, the modulation curvature parameter N needs to be changed based on an expected change degree of adaptive adjustment. For example, in FIG. 9, when N=0.01, it can be learned that within the most part of the range, the value of K approximates to or is equal to 1. In this way, a range of a switching state is relatively large. When the value of K is not equal to 1, a coverage range of a transition state is relatively small. The modulation curvature parameter N needs to be set by using both a hardware system structure of the three-phase converter and parameters. Similarly, if N=99, it can be learned that a transition state (K is not equal to 1) occupies the most part of space, and a switching state (K=1) is reached only at a maximum modulation degree. Therefore, the preset modulation coefficient can reduce the time of a switching state of the three-phase converter, thereby further improving efficiency of the three-phase converter.

Optionally, in some embodiments of the present invention, the calculating a modulation wave set corresponding to the initial three-phase modulation waves based on a preset maximum modulation-wave amplitude-limiting value, a preset minimum modulation-wave amplitude-limiting value, the initial three-phase modulation waves, and the common-mode-component change-rate adjustment coefficient, and selecting a modulation wave having a minimum absolute value from the modulation wave set as a common-mode modulation wave includes:

obtaining the preset maximum modulation-wave amplitude-limiting value $v_{max}$ and the preset minimum modulation-degree amplitude-limiting value $v_{min}$;

calculating a modulation wave set $\{v_{max}-v_a, K^*(v_{max}/2+v_{min}/2-v_a), v_{min}-v_a\}$ corresponding to $v_a$ based on $v_{max}$, $v_{min}$, the common-mode-component change-rate adjustment coefficient K, and an initial first-phase modulation wave $v_a$ of the initial three-phase modulation waves, where $v_{max}-v_a$ is a modulation wave variable in a positive clamping state corresponding to $v_a$, $v_{min}-v_a$ is a modulation wave variable in a negative clamping state corresponding to $v_a$, and $K^*(v_{max}/2+v_{min}/2-v_a)$ is a modulation wave variable in a switching state corresponding to $v_a$;

calculating a modulation wave set $\{v_{max}-v_b, K^*(v_{max}/2+v_{min}/2-v_b), v_{min}-v_b\}$ corresponding to $v_b$ based on $v_{max}$, $v_{min}$, the common-mode-component change-rate adjustment coefficient K, and an initial second-phase modulation wave $v_b$ of the initial three-phase modulation waves, where $v_{max}-v_b$ is a modulation wave variable in a positive clamping state corresponding to $v_b$, $v_{min}-v_b$ is a modulation wave variable in a negative clamping state corresponding to $v_b$, and $K^*(v_{max}/2+v_{min}/2-v_b)$ is a modulation wave variable in a switching state corresponding to $v_b$;

calculating a modulation wave set $\{v_{max}-v_c, K^*(v_{max}/2+v_{min}/2-v_c), v_{min}-v_c\}$ corresponding to $v_c$ based on $v_{max}$, $v_{min}$, the common-mode-component change-rate adjustment coefficient K, and an initial second-phase modulation wave $v_c$ of the initial three-phase modulation waves, where $v_{max}-v_c$ is a modulation wave variable in a positive clamping state corresponding to $v_c$, $v_{min}-v_c$ is a modulation wave variable in a negative clamping state corresponding to $v_c$, and $K^*(v_{max}/2+v_{min}/2-v_c)$ is a modulation wave variable in a switching state corresponding to $v_c$;

obtaining the modulation wave set $\{v_{max}-v_a, v_{max}-v_b, v_{max}-v_c, K^*(v_{max}/2+v_{min}/2-v_a), K^*(v_{max}/2+v_{min}/2-v_b), K^*(v_{max}/2+v_{min}/2-v_c), v_{min}-v_a, v_{min}-v_b, v_{min}-v_c\}$ corresponding to the initial three-phase modulation waves based on the modulation wave sets corresponding to $v_a$, $v_b$, and $v_c$; and calculating an absolute value of each modulation wave variable in the common-mode modulation wave set, and selecting a modulation wave variable having a minimum absolute value as the common-mode modulation wave.

In this embodiment of the present invention, the maximum modulation-wave amplitude-limiting value and the minimum modulation-wave amplitude-limiting value need to be preset. The preset modulation-wave amplitude-limiting values are obtained. The initial three-phase modulation waves, the common-mode-component change-rate adjustment coefficient, and the preset modulation-wave amplitude-limiting values are substituted into a preset common-mode modulation wave variable set. Each phase in the three-phase converter corresponds to one switch, and each switch has three clamping states. Therefore, the preset common-mode modulation wave variable set includes modulation wave variables in a positive clamping state, a negative clamping state, and a switching state corresponding to the initial modulation wave of each phase. Therefore, there are nine modulation wave variables. To minimize impact on system stability, one of the nine modulation wave variables that has the minimum absolute value is selected as the common-mode modulation wave. It is assumed that the preset modulation-wave amplitude-limiting values are $v_{max}=1$ and $v_{min}=-1$. The initial three-phase modulation waves $v_a$, $v_b$, and $v_c$, the common-mode-component change-rate adjustment coefficient K, and the preset modulation-wave amplitude-limiting values $v_{max}=1$ and $v_{min}=-1$ are substituted into the preset common-mode modulation wave variable set $\{1-v_a, 1-v_b, 1-v_c, K^*(\frac{1}{2}+-\frac{1}{2}-v_a), K^*(\frac{1}{2}+-\frac{1}{2}-v_b), K^*(\frac{1}{2}+-\frac{1}{2}-v_c), -1-v_a, -1-v_b, -1-v_c\}$, which includes nine variables. One of the nine variables that has the minimum absolute value is selected as the common-mode modulation wave vz. A calculation process is as follows:

1. When an absolute value of $1-\max\{v_a, v_b, v_c\}$ is less than an absolute value of $-1-\min\{v_a, v_b, v_c\}$, an absolute value of $K^*\min\{v_a, v_b, v_c\}$, and an absolute value of $K^*\max\{v_a, v_b, v_c\}$, $v_z=1-\max\{v_a, v_b, v_c\}$.

2. When an absolute value of $K^*\min\{v_a, v_b, v_c\}$ is less than an absolute value of $1-\max\{v_a, v_b, v_c\}$, an absolute value of $-1-\min\{v_a, v_b, v_c\}$, and an absolute value of $K^*\max\{v_a, v_b, v_c\}$, $v_z=-K^*\min\{v_a, v_b, v_c\}$.

3. When an absolute value of $K^*\max\{v_a, v_b, v_c\}$ is less than an absolute value of $1-\max\{v_a, v_b, v_c\}$, an absolute value of $-1-\min\{v_a, v_b, v_c\}$, and an absolute value of $K^*\min\{v_a, v_b, v_c\}$, $v_z=-K^*\max\{v_a, v_b, v_c\}$.

4. When an absolute value of $-1-\min\{v_a, v_b, v_c\}$ is less than an absolute value of $1-\max\{v_a, v_b, v_c\}$, an absolute value of $K^*\min\{v_a, v_b, v_c\}$, and an absolute value of $K^*\max\{v_a, v_b, v_c\}$, $v_z=-1-\min\{v_a, v_b, v_c\}$.

Optionally, in some embodiments of the present invention, the performing waveform superposition on the initial three-phase modulation waves and the common-mode modulation wave to obtain output three-phase modulation waves includes:

performing waveform superposition on an initial modulation wave of each phase of the initial three-phase modulation waves and the common-mode modulation wave in a one-to-one correspondence to obtain the output three-phase modulation waves.

In this embodiment of the present invention, the common-mode modulation wave vz is added to each of the initial three-phase modulation waves $v_a$, $v_b$, and $v_c$ to obtain new output three-phase modulation waves $v_{a\_mod}$, $v_{b\_mod}$, and $v_{c\_mod}$.

Figure 10:
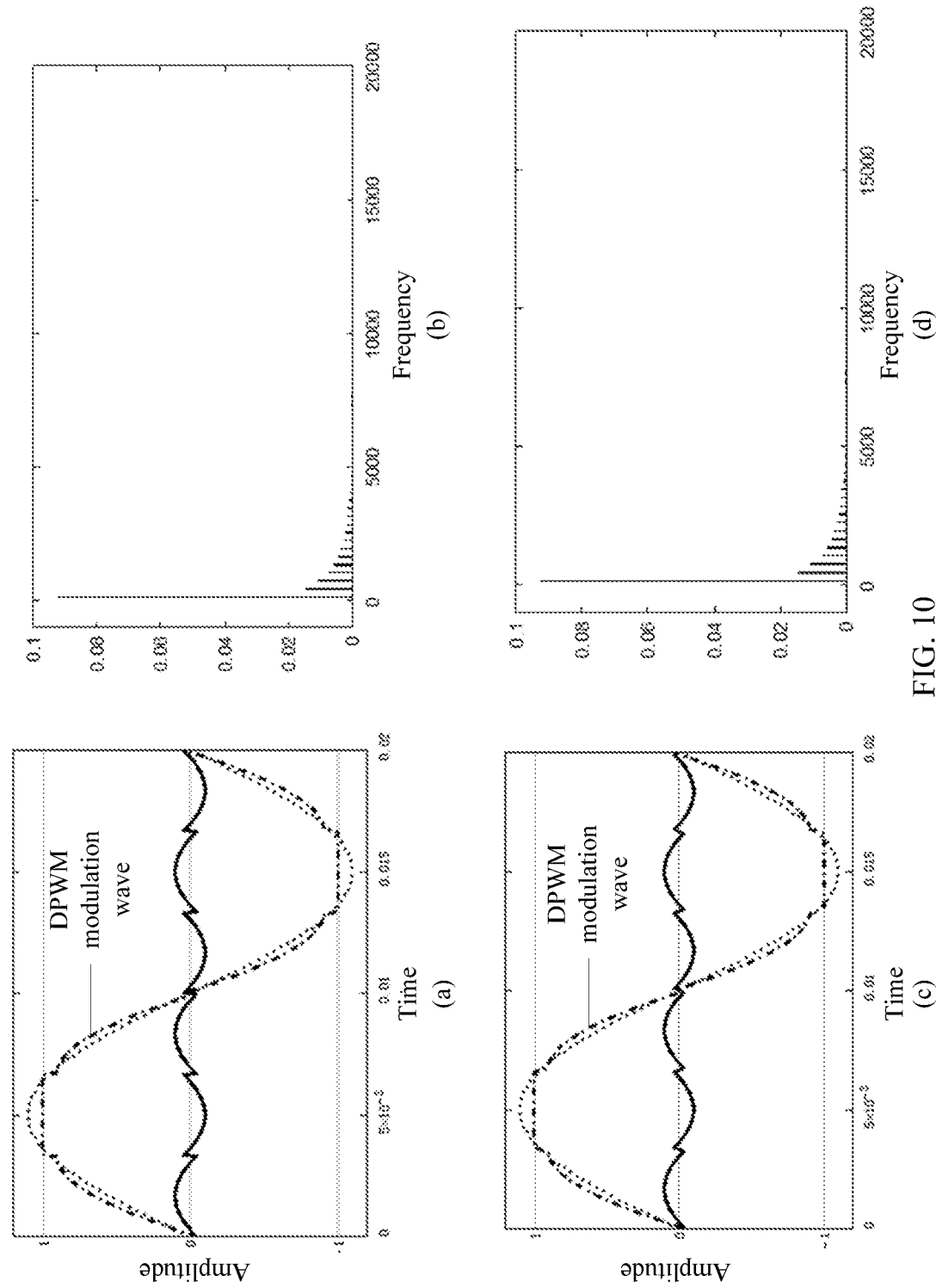
FIG. 10 is a diagram showing effect comparison between DPWM of the present invention and conventional DPWM when a converter modulation degree M=1.1 according to this application.

An effect achieved by the technical solution of the present invention is compared with an effect of a conventional DPWM solution. A comparison result obtained when a converter modulation degree M=1.1 is shown in FIG. 10. FIG. 10(a) and FIG. 10(b) show a conventional DPWM modulation waveform and a spectrum diagram of common-mode injection when a converter modulation degree M=1.1. FIG. 10(c) and FIG. 10(d) show a DPWM modulation waveform and a spectrum diagram of common-mode injection according to the present invention. As can be learned from the comparison in FIG. 10, when a modulation degree M is relatively high, this solution and the conventional DPWM method have very close modulation waveforms and spectral characteristics. In this case, a high-frequency component of an injected common-mode signal is relatively small, and a common-mode voltage source does not need to be limited, so that switching and clamping effects of the converter can be maximized and efficiency is improved.

Figure 11:
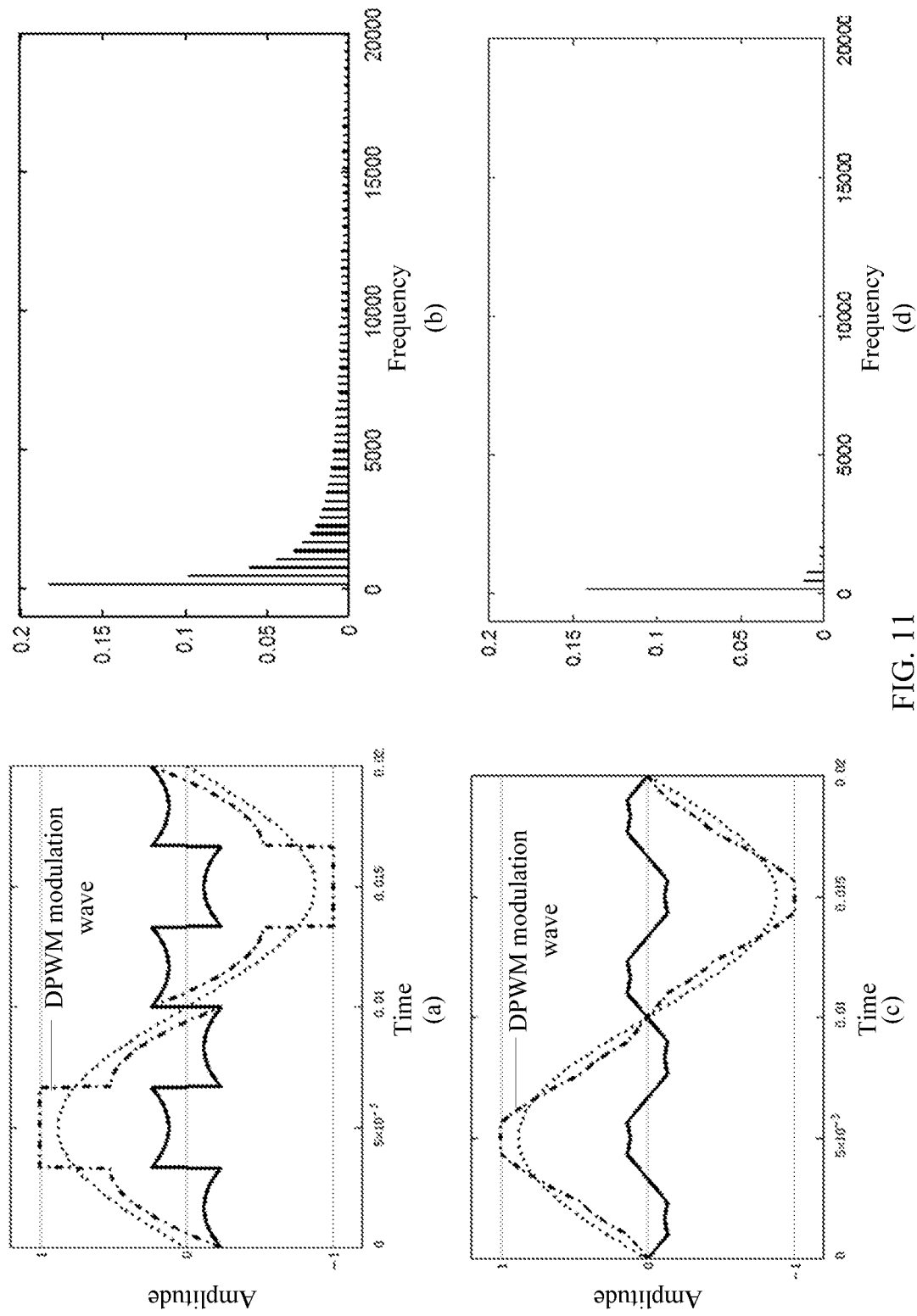
FIG. 11 is a diagram showing effect comparison between DPWM of the present invention and conventional DPWM when a converter modulation degree M=0.8 according to this application.

A comparison result when a converter modulation degree M=0.8 is shown in FIG. 11. FIG. 11(a) and FIG. 11(b) show a conventional DPWM modulation waveform and a spectrum diagram of common-mode injection when a converter modulation degree M=0.8. FIG. 11(c) and FIG. 11(d) show a DPWM modulation waveform and a spectrum diagram of common-mode injection according to the present invention. As can be learned from the comparison in FIG. 11, as a modulation degree decreases, a common-mode component injected in the conventional DPWM increases. When a modulation degree is relatively low, this solution and the conventional DPWM method have greatly different modulation waveforms. In this solution, an injected common-mode component is relatively smooth, and a spectral component is much less than that in the conventional DPWM solution.

The pulse width modulation method is described in the foregoing embodiments, and a pulse width modulation system is described below by using embodiments.

Figure 12:
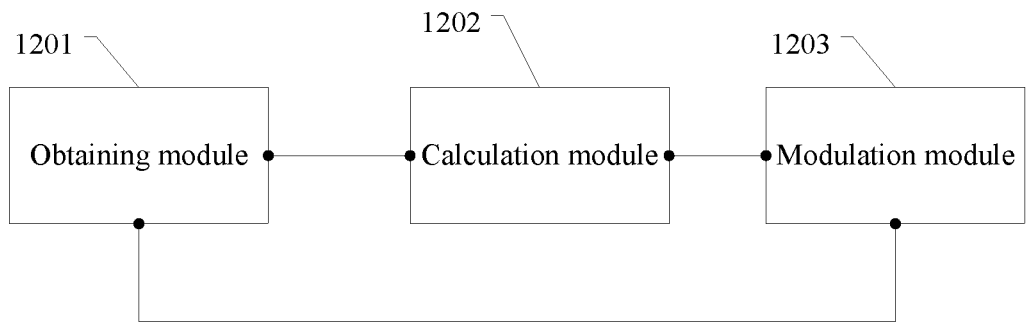
FIG. 12 is a schematic structural diagram of an embodiment of a pulse width modulation system according to this application.

Referring to FIG. 12, the present invention provides a pulse width modulation system, applied to a three-phase converter, and including:

an obtaining module 1201, configured to obtain initial three-phase modulation waves and a converter modulation degree;

a calculation module 1202, configured to calculate a common-mode-component change-rate adjustment coefficient based on preset modulation parameters and the converter modulation degree, where the preset modulation parameters include a preset maximum modulation degree, a preset minimum modulation degree, a preset minimum common-mode-component change rate between a positive clamping state and a negative clamping state, a preset difference between a maximum common-mode-component change rate and a minimum common-mode-component change rate between a positive clamping state and a negative clamping state, and a modulation curvature parameter of the three-phase converter, where the calculation module 1202 is further configured to: calculate a modulation wave set corresponding to the initial three-phase modulation waves based on a preset maximum modulation-wave amplitude-limiting value, a preset minimum modulation-wave amplitude-limiting value, the initial three-phase modulation waves, and the common-mode-component change-rate adjustment coefficient, and select a modulation wave having a minimum absolute value from the modulation wave set as a common-mode modulation wave; and a modulation module 1203, further configured to perform waveform superposition on the initial three-phase modulation waves and the common-mode modulation wave to obtain output three-phase modulation waves.

In this embodiment of the present invention, a change rate of the common-mode component is determined by the common-mode-component change-rate adjustment coefficient. The common-mode-component change-rate adjustment coefficient is calculated by the calculation module 1202 based on the converter modulation degree obtained by the obtaining module 1201. The calculation module 1202 obtains the common-mode modulation wave based on the initial three-phase modulation waves and the common-mode-component change-rate adjustment coefficient. The modulation module 1203 obtains the output three-phase modulation waves based on the initial three-phase modulation waves and the common-mode modulation wave. Compared with 1 in the prior art, because the change rate of the common-mode component is determined by the converter modulation degree and changes upon a change of the converter modulation degree, and there is no amplitude-limiting stage, impact caused by an inappropriate amplitude-limiting value can be avoided, and stability and harmonic characteristics of the three-phase converter are improved. Compared with 2 in the prior art, the change rate of the common-mode component is determined by the converter modulation degree, thereby implementing adaptive adjustment.

Optionally, in some embodiments of the present invention, the obtaining module 1201 is further configured to obtain the preset maximum modulation degree $M_{max}$, the preset minimum modulation degree $M_{min}$, the preset minimum common-mode-component change rate $K_b$ between a positive clamping state and a negative clamping state, the preset difference $K_a$ between a maximum common-mode-component change rate and a minimum common-mode-component change rate between a positive clamping state and a negative clamping state, and the modulation curvature parameter N of the three-phase converter, where N is greater than 0; and the calculation module 1202 is further configured to substitute $M_{max}$, $M_{min}$, $K_b$, $K_a$, N, and the converter modulation degree M into a formula $$K = K_a \times \left(\frac{M - M_{min}}{M_{max} - M_{min}}\right)^N + K_b$$

to calculate the common-mode-component change-rate adjustment coefficient K.

In this embodiment of the present invention, the modulation coefficients need to be preset. The maximum modulation degree $M_{max}$ and the minimum modulation degree $M_{min}$ are a maximum modulation degree (generally, $M_{max}$ does not exceed 1.15) and a minimum modulation degree (generally, $M_{min}$ is less than 1) that are allowed by the three-phase converter and that are determined by a product design and an application scenario of the converter. Therefore, the maximum modulation degree $M_{max}$ and the minimum modulation degree $M_{min}$ are substantially two constant values. The minimum common-mode-component change rate $K_b$ between a positive clamping state and a negative clamping state is determined by a scenario in which the three-phase converter is located, or may be freely set by a user. For the difference $K_a$ between the maximum common-mode-component change rate and $K_b$, assuming that the maximum common-mode-component change rate that is between a positive clamping state and a negative clamping state and that is allowable by the three-phase converter is 1, $K_a$ is equal to $1-K_b$. A value of the modulation curvature parameter N is preset. If N is 1, it is preset that a common-mode component adjustment formula is a linear formula. If N is greater than 0 and is not equal to 1, it is preset that a common-mode component adjustment formula is a curve equation. If the obtaining module 1201 obtains values of M, $M_{max}$, $M_{min}$, $K_b$, $K_a$, and N, the calculation module 1202 can calculate a value of the common-mode-component change-rate adjustment coefficient K by using the formula. The values of $M_{max}$, $M_{min}$, $K_b$, $K_a$, and N are all preset and adjustable. In this case, the value of K is determined by M, so that the change rate of the common-mode component is flexibly adjusted by using the converter modulation degree M.

Optionally, in some embodiments of the present invention, the obtaining module 1201 is further configured to obtain the preset maximum modulation-wave amplitude-limiting value $v_{max}$ and the preset minimum modulation-degree amplitude-limiting value $v_{min}$;

the calculation module 1202 is further configured to calculate a modulation wave set $\{v_{max}-v_a, K^*(v_{max}/2+v_{min}/2-v_a), v_{min}-v_a\}$ corresponding to $v_a$ based on $v_{max}$, $v_{min}$, the common-mode-component change-rate adjustment coefficient K, and an initial first-phase modulation wave $v_a$ of the initial three-phase modulation waves, where $v_{max}-v_a$ is a modulation wave variable in a positive clamping state corresponding to $v_a$, $v_{min}-v_a$ is a modulation wave variable in a negative clamping state corresponding to $v_a$, and $K^*(v_{max}/2+v_{min}/2-v_a)$ is a modulation wave variable in a switching state corresponding to $v_a$;

the calculation module 1202 is further configured to calculate a modulation wave set $\{v_{max}-v_b, K^*(v_{max}/2+v_{min}/2-v_b), v_{min}-v_b\}$ corresponding to $v_b$ based on $v_{max}$, $v_{min}$, the common-mode-component change-rate adjustment coefficient K, and an initial second-phase modulation wave $v_b$ of the initial three-phase modulation waves, where $v_{max}-v_b$ is a modulation wave variable in a positive clamping state corresponding to $v_b$, $v_{min}-v_b$ is a modulation wave variable in a negative clamping state corresponding to $v_b$, and $K^*(v_{max}/2+v_{mid}/2-v_b)$ is a modulation wave variable in a switching state corresponding to $v_b$;

the calculation module 1202 is further configured to calculate a modulation wave set $\{v_{max}-v_c, K^*(v_{max}/2+v_{min}/2-v_c), v_{min}-v_c\}$ corresponding to $v_c$ based on $v_{max}$, $v_{min}$, the common-mode-component change-rate adjustment coefficient K, and an initial second-phase modulation wave $v_c$ of the initial three-phase modulation waves, where $v_{max}-v_c$ is a modulation wave variable in a positive clamping state corresponding to $v_c$, $v_{min}-v_c$ is a modulation wave variable in a negative clamping state corresponding to $v_c$, and $K^*(v_{max}/2+v_{min}/2-v_c)$ is a modulation wave variable in a switching state corresponding to $v_c$;

the calculation module 1202 is further configured to obtain the modulation wave set $\{v_{max}-v_a, v_{max}-v_b, v_{max}-v_c, K^*(v_{max}/2+v_{min}/2-v_a), K^*(v_{max}/2+v_{min}/2-v_b), K^*(v_{max}/2+v_{min}/2-v_c), v_{min}-v_a, v_{min}-v_b, v_{min}-v_c\}$ corresponding to the initial three-phase modulation waves based on the modulation wave sets corresponding to $v_a$, $v_b$, and $v_c$; and the calculation module 1202 is further configured to: calculate an absolute value of each modulation wave variable in the common-mode modulation wave set, and select a modulation wave variable having a minimum absolute value as the common-mode modulation wave.

In this embodiment of the present invention, a maximum modulation-wave amplitude value and a minimum modulation-wave amplitude value are preset. The obtaining module 1201 obtains the preset maximum modulation-wave amplitude value and the preset minimum modulation-wave amplitude value. Each phase in the three-phase converter corresponds to one switch, and each switch has three clamping states. Therefore, the calculation module 1202 calculates the modulation wave set $\{v_{max}-v_a, K^*(v_{max}/2+v_{min}/2-v_a), v_{min}-v_a\}$ corresponding to $v_a$ based on $v_{max}$, $v_{min}$, the common-mode-component change-rate adjustment coefficient K, and the initial first-phase modulation wave $v_a$ of the initial three-phase modulation waves, where $v_{max}-v_a$ is the modulation wave variable in the positive clamping state corresponding to $v_a$, $v_{min}-v_a$ is the modulation wave variable in the negative clamping state corresponding to $v_a$, and $K^*(v_{max}/2+v_{min}/2-v_a)$ is the modulation wave variable in the switching state corresponding to $v_a$. The modulation wave set $\{v_{max}-v_b, K^*(v_{max}/2+v_{min}/2-v_b), v_{min}-v_b\}$ corresponding to the initial second-phase modulation wave $v_b$ and the modulation wave set $\{v_{max}-v_b, K^*(v_{max}/2+v_{min}/2-v_b), v_{min}-v_b\}$ corresponding to the initial third-phase modulation wave $v_b$ are sequentially calculated. The calculation module 1202 combines the modulation wave sets of initial three-phase modulation waves into the modulation wave set $\{v_{max}-v_a, v_{max}-v_b, v_{max}-v_c, K^*(v_{max}/2+v_{min}/2-v_a), K^*(v_{max}/2+v_{min}/2-v_b), K^*(v_{max}/2+v_{min}/2-v_c), v_{min}-v_a, v_{min}-v_b, v_{min}-v_c\}$ corresponding to the initial three-phase modulation waves, calculates the absolute value of each modulation wave variable in the common-mode modulation wave set, and selects the modulation wave variable having the minimum absolute value as the common-mode modulation wave.

Optionally, in some embodiments of the present invention, the modulation module 1203 is specifically configured to perform waveform superposition on an initial modulation wave of each phase of the initial three-phase modulation waves and the common-mode modulation wave in a one-to-one correspondence to obtain the output three-phase modulation waves.

Optionally, in some embodiments of the present invention, the obtaining module 1201 is configured to obtain three-phase grid voltages, three-phase currents, and a preset carrier amplitude value;

the calculation module 1202 is further configured to perform phase locking processing on the three-phase grid voltages to obtain a rotating coordinate system phase;

the calculation module 1202 is further configured to perform coordinate transformation on the three-phase currents based on the rotating coordinate system phase to obtain rotating coordinate system currents;

the obtaining module 1201 is further configured to: obtain a preset current reference value for coordinate transformation of the three-phase currents, and calculate differences between the preset current reference value and the rotating coordinate system currents to obtain current differences;

the calculation module 1202 is further configured to process the current differences by using proportional-integral PI regulators to obtain rotating coordinate system adjustment components;

the calculation module 1202 is further configured to perform inverse coordinate transformation on the rotating coordinate system adjustment components to obtain the initial three-phase modulation waves; and the calculation module 1202 is further configured to: obtain a modulation-wave amplitude value of the initial three-phase modulation waves, and obtain the converter modulation degree based on a ratio of the modulation-wave amplitude value to the preset carrier amplitude value.

In this embodiment of the present invention, the obtaining module 1201 detects the three-phase converter to obtain the three-phase grid voltages, the three-phase currents, and the preset carrier amplitude value. The calculation module 1202 feeds the three-phase grid voltages into a phase-locked loop to obtain the rotating coordinate system phase, performs coordinate transformation on the three-phase currents based on the rotating coordinate system phase to obtain the rotating coordinate system currents, obtains the preset current reference value for coordinate transformation of the three-phase currents, calculates the differences between the preset current reference value and the rotating coordinate system currents to obtain the current differences, processes the current differences by using the PI regulators to obtain the rotating coordinate system adjustment components, performs inverse coordinate transformation on the rotating coordinate system adjustment components to obtain the initial three-phase modulation waves, obtains the modulation-wave amplitude value of the initial three-phase modulation waves, and obtains the converter modulation degree based on the ratio of the modulation-wave amplitude value to the preset carrier amplitude value.

Figure 13:
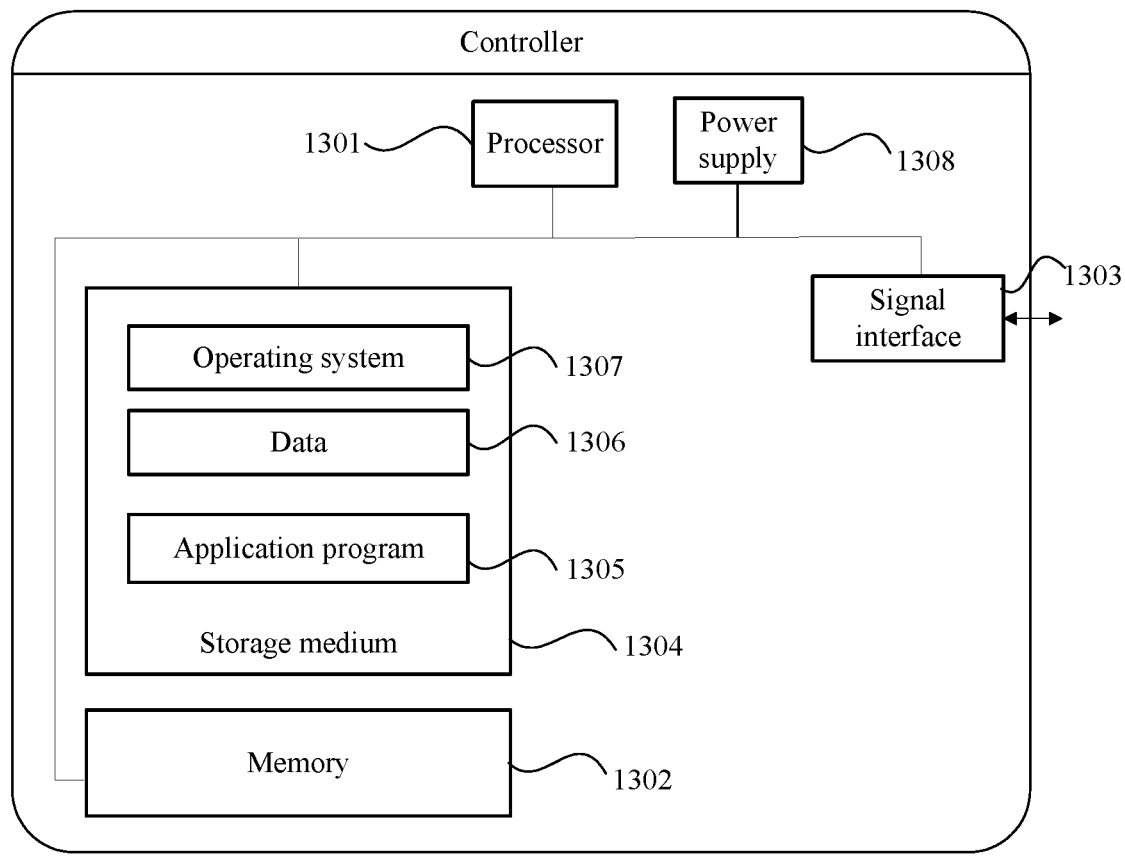
FIG. 13 is a schematic structural diagram of an embodiment of a controller according to this application.

The pulse width modulation method and the pulse width modulation system are described in detail in the foregoing embodiments. A physical apparatus of the pulse width modulation system is described below. The physical apparatus is a controller shown in FIG. 13, and details are as follows:

Referring to FIG. 13, the present invention provides a controller, including:

a processor 1301, a memory 1302, and a signal interface 1303 connected to each other, where the memory 1302 stores an operation instruction of the processor 1301;

the signal interface 1303 is configured to obtain initial three-phase modulation waves and a converter modulation degree;

the processor 1301 is configured to calculate a common-mode-component change-rate adjustment coefficient based on preset modulation parameters and the converter modulation degree, where the preset modulation parameters include a preset maximum modulation degree, a preset minimum modulation degree, a preset minimum common-mode-component change rate between a positive clamping state and a negative clamping state, a preset difference between a maximum common-mode-component change rate and a minimum common-mode-component change rate between a positive clamping state and a negative clamping state, and a modulation curvature parameter of a three-phase converter;

the processor 1301 is further configured to: calculate a modulation wave set corresponding to the initial three-phase modulation waves based on a preset maximum modulation-wave amplitude-limiting value, a preset minimum modulation-wave amplitude-limiting value, the initial three-phase modulation waves, and the common-mode-component change-rate adjustment coefficient, and select a modulation wave having a minimum absolute value from the modulation wave set as a common-mode modulation wave; and the processor 1301 is further configured to perform waveform superposition on the initial three-phase modulation waves and the common-mode modulation wave to obtain output three-phase modulation waves.

In this embodiment of the present invention, the common-mode-component change-rate adjustment coefficient is calculated by the processor 1301 based on the preset modulation parameters and the converter modulation degree that is obtained by the signal interface 1303. The preset modulation parameters include the preset maximum modulation degree, the preset minimum modulation degree, the preset minimum common-mode-component change rate between a positive clamping state and a negative clamping state, the preset difference between a maximum common-mode-component change rate and a minimum common-mode-component change rate between a positive clamping state and a negative clamping state, and the modulation curvature parameter of the three-phase converter. The processor 1301 calculates the modulation wave set corresponding to the initial three-phase modulation waves based on the preset maximum modulation-wave amplitude-limiting value, the preset minimum modulation-wave amplitude-limiting value, the initial three-phase modulation waves, and the common-mode-component change-rate adjustment coefficient, selects the modulation wave having the minimum absolute value from the modulation wave set as the common-mode modulation wave, and finally, performs waveform superposition on the initial three-phase modulation waves and the common-mode modulation wave to obtain the output three-phase modulation waves. Compared with Method 1 in the prior art, because the change rate of the common-mode component is determined by the converter modulation degree and changes upon a change of the converter modulation degree, and there is no amplitude-limiting stage, impact caused by an inappropriate amplitude-limiting value can be avoided, and stability and harmonic characteristics of the three-phase converter are improved. Compared with 2 in the prior art, the change rate of the common-mode component is determined by the converter modulation degree, thereby implementing adaptive adjustment.

The controller shown in FIG. 13 further includes one or more storage media 1304 (for example, one or more massive storage devices) for storing an application program 1305 or data 1306. The memory 1302 and the storage medium 1304 may be a temporary storage or a permanent storage. The program stored in the storage medium 1304 may include one or more modules (not shown in the figure). Each module may include a series of instruction operations in a server. Furthermore, the processor 1301 may be configured to communicate with the storage medium 1304 and execute, on the server, the series of instruction operations in the storage medium 1304.

The controller may further include one or more operating systems 1307 such as Windows Server™, Mac OS X™, Unix™, Linux™, or FreeBSD™.

Figure 14:
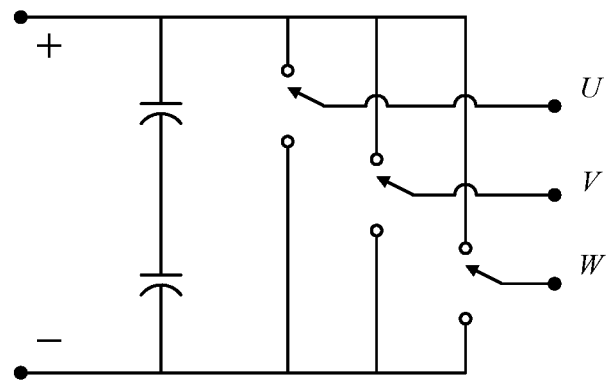
FIG. 14 is a schematic diagram of a two-level rectifier/inverter structure according to this application.
Figure 15:
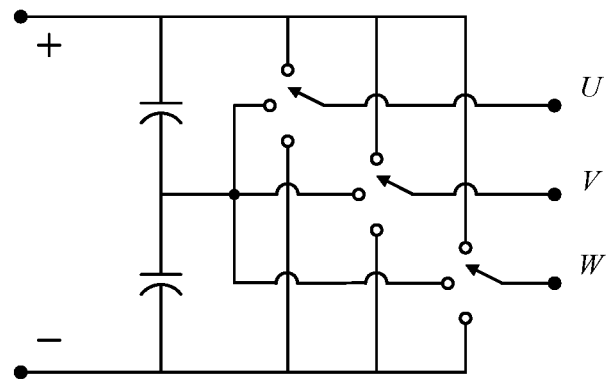
FIG. 15 is a schematic diagram of a three-level rectifier/inverter structure according to this application.
Figure 16:
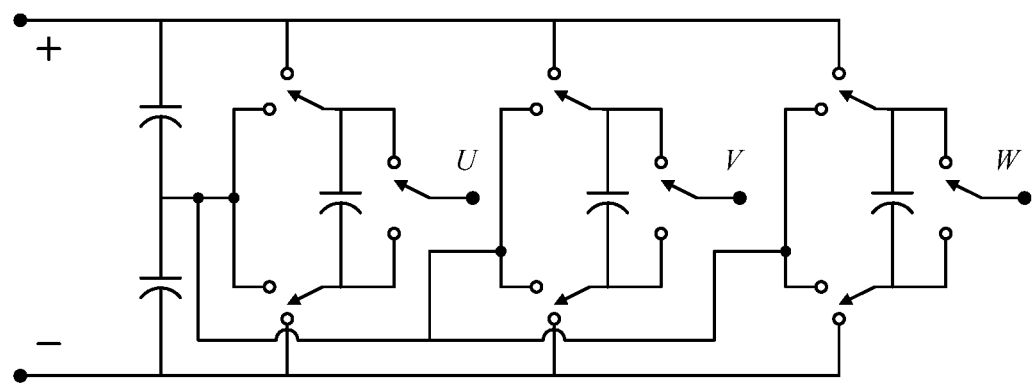
FIG. 16 is a schematic diagram of a five-level rectifier/inverter structure according to this application.
Figure 17:
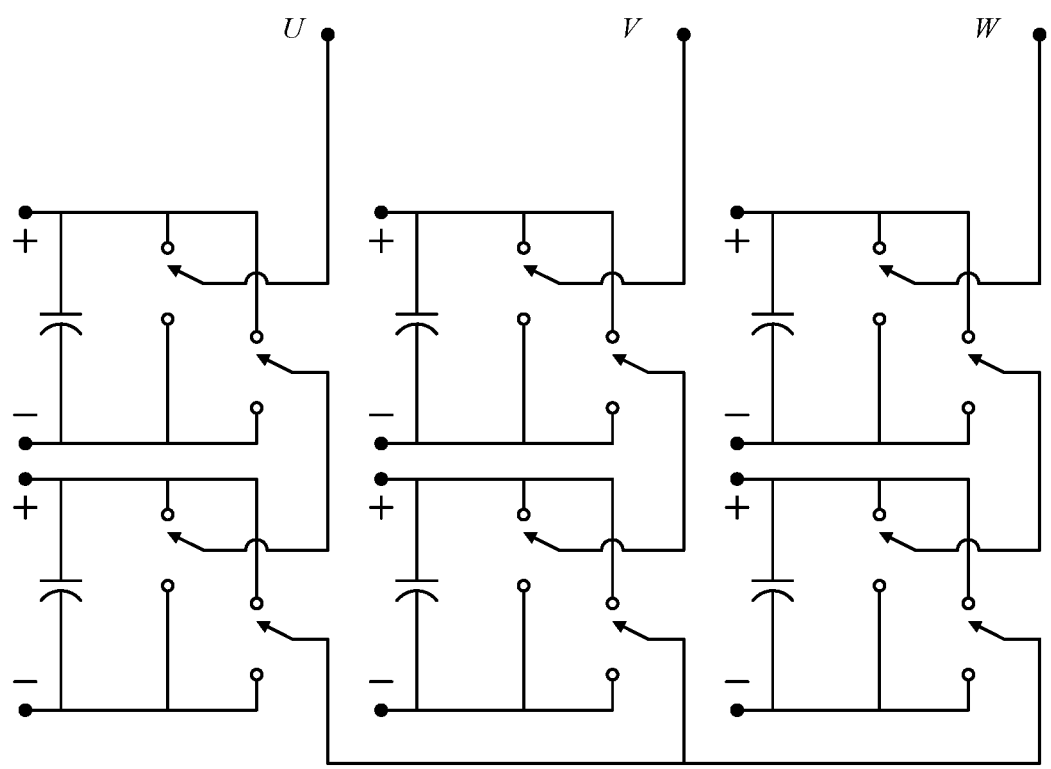
FIG. 17 is a schematic diagram of a cascaded multilevel rectifier/inverter structure according to this application.

It should be noted that the photovoltaic inverter application system shown in FIG. 7 mentioned in the present invention may be equivalent to a two-level rectifier/inverter structure shown in FIG. 14, a three-level rectifier/inverter structure shown in FIG. 15, a five-level rectifier/inverter structure shown in FIG. 16, or a cascaded multilevel rectifier/inverter structure shown in FIG. 17.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

In conclusion, the foregoing embodiments are merely intended for describing the technical solutions of the present invention, and not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A pulse width modulation method, wherein the method is applied to a three-phase converter, and comprises:
obtaining initial three-phase modulation waves and a converter modulation degree;
calculating a common-mode-component change-rate adjustment coefficient based on preset modulation parameters and the converter modulation degree, wherein the preset modulation parameters comprise a preset maximum modulation degree, a preset minimum modulation degree, a preset minimum common-mode-component change rate between a positive clamping state and a negative clamping state, a preset difference between a maximum common-mode-component change rate and the minimum common-mode-component change rate between the positive clamping state and the negative clamping state, and a modulation curvature parameter of the three-phase converter;
calculating a modulation wave set corresponding to the initial three-phase modulation waves based on a preset maximum modulation-wave amplitude-limiting value, a preset minimum modulation-wave amplitude-limiting value, the initial three-phase modulation waves, and the common-mode-component change-rate adjustment coefficient;
selecting a common-mode modulation wave from the modulation wave set, wherein the common-mode modulation wave has a minimum absolute value; and
performing waveform superposition on the initial three-phase modulation waves and the common-mode modulation wave to obtain output three-phase modulation waves.

2. The pulse width modulation method according to claim 1, wherein the calculating the common-mode-component change-rate adjustment coefficient based on preset modulation parameters and the converter modulation degree comprises:
obtaining the preset maximum modulation degree $M_{max}$, the preset minimum modulation degree $M_{min}$, the preset minimum common-mode-component change rate $K_b$ between the positive clamping state and the negative clamping state, the preset difference $K_a$ between the maximum common-mode-component change rate and the minimum common-mode-component change rate between the positive clamping state and the negative clamping state, and the modulation curvature parameter N of the three-phase converter, wherein N is greater than 0; and
substituting $M_{max}$, $M_{min}$, $K_b$, $K_a$, N, and the converter modulation degree M into a formula $$K = K_a \times \left( \frac{M - M_{min}}{M_{max} - M_{min}} \right)^N + K_b$$

to calculate K, wherein K represents the common-mode-component change-rate adjustment coefficient.

3. The pulse width modulation method according to claim 2, wherein the calculating a modulation wave set corresponding to the initial three-phase modulation waves based on the preset maximum modulation-wave amplitude-limiting value, the preset minimum modulation-wave amplitude-limiting value, the initial three-phase modulation waves, and the common-mode-component change-rate adjustment coefficient, and selecting the common-mode modulation wave comprises:
obtaining the preset maximum modulation-wave amplitude-limiting value $v_{max}$ and the preset minimum modulation-wave amplitude-limiting value $v_{min}$;
calculating a modulation wave set $\{v_{max}-v_a, K^*(v_{max}/2+v_{min}/2-v_a), v_{min}-v_a\}$ corresponding to $v_a$ based on $v_{max}$, $v_{min}$, the common-mode-component change-rate adjustment coefficient K, and an initial first-phase modulation wave $v_a$ of the initial three-phase modulation waves, wherein $v_{max}-v_a$ is a modulation wave variable in a first positive clamping state corresponding to $v_a$, $v_{min}-v_a$ is a modulation wave variable in a first negative clamping state corresponding to $v_a$, and $K^*(v_{max}/2+v_{min}/2-v_a)$ is a modulation wave variable in a switching state corresponding to $v_a$;
calculating a modulation wave set $\{v_{max}-v_b, K^*(v_{max}/2+v_{min}/2-v_b), v_{min}-v_b\}$ corresponding to $v_b$ based on $v_{max}$, $v_{min}$, the common-mode-component change-rate adjustment coefficient K, and an initial second-phase modulation wave $v_b$ of the initial three-phase modulation waves, wherein $v_{max}-v_b$ is a modulation wave variable in a second positive clamping state corresponding to $v_b$, $v_{min} - v_b$ is a modulation wave variable in a second negative clamping state corresponding to $v_b$, and $K * (v_{max}/2 + v_{min}/2 - v_b)$ is a modulation wave variable in a switching state corresponding to $v_b$;

calculating a modulation wave set $\{v_{max} - v_c, K*(v_{max}/2 + v_{min}/2 - v_c), v_{min} - v_c\}$ corresponding to $v_c$ based on $v_{max}$, $v_{min}$, the common-mode-component change-rate adjustment coefficient K, and an initial third-phase modulation wave $v_c$ of the initial three-phase modulation waves, wherein $v_{max} - v_c$ is a modulation wave variable in a third positive clamping state corresponding to $v_c$, $v_{min} - v_c$ is a modulation wave variable in a third negative clamping state corresponding to $v_c$, and $K*(v_{max}/2 + v_{min}/2 - v_c)$ is a modulation wave variable in a switching state corresponding to $v_c$;

obtaining the modulation wave set $\{v_{max} - va, v_{max} - v_b, v_{max} - vv_c, K*(v_{max}/2 + v_{min}/2 - va), K*(v_{max}/2 + v_{min}/2 - v_b), K*(v_{max}/2 + v_{min}/2 - v_c), v_{min} - va, v_{min} - v_b, v_{min} - v_c\}$ corresponding to the initial three-phase modulation waves based on the modulation wave sets corresponding to $v_a$, $v_b$, and $v_c$; and calculating an absolute value of each modulation wave variable in the modulation wave set, and selecting a modulation wave variable having a minimum absolute value as the common-mode modulation wave.

4. The pulse width modulation method according to claim 1, wherein the performing waveform superposition on the initial three-phase modulation waves and the common-mode modulation wave to obtain output three-phase modulation waves comprises:

performing waveform superposition on an initial modulation wave of each phase of the initial three-phase modulation waves and the common-mode modulation wave in a one-to-one correspondence to obtain the output three-phase modulation waves.

5. The pulse width modulation method according to claim 4, wherein the obtaining initial three-phase modulation waves and the converter modulation degree comprises:

obtaining three-phase grid voltages, three-phase currents, and a preset carrier amplitude value;

performing phase locking processing on the three-phase grid voltages to obtain a rotating coordinate system phase;

performing coordinate transformation on the three-phase currents based on the rotating coordinate system phase to obtain rotating coordinate system currents;

obtaining a preset current reference value for coordinate transformation of the three-phase currents;

calculating differences between the preset current reference value and the rotating coordinate system currents to obtain current differences;

processing the current differences by using Proportional-Integral (PI) regulators to obtain rotating coordinate system adjustment components;

performing inverse coordinate transformation on the rotating coordinate system adjustment components to obtain the initial three-phase modulation waves;

obtaining a modulation-wave amplitude value of the initial three-phase modulation waves; and obtaining the converter modulation degree based on a ratio of the modulation-wave amplitude value to the preset carrier amplitude value.

6. A pulse width modulation system, applied to a three-phase converter, and comprising:

a non-transitory memory storage comprising instructions; and one or more hardware processors in communication with the non-transitory memory storage, wherein the one or more hardware processors execute the instructions to:

obtain initial three-phase modulation waves and a converter modulation degree;

calculate a common-mode-component change-rate adjustment coefficient based on preset modulation parameters and the converter modulation degree, wherein the preset modulation parameters comprise a preset maximum modulation degree, a preset minimum modulation degree, a preset minimum common-mode-component change rate between a positive clamping state and a negative clamping state, a preset difference between a maximum common-mode-component change rate and the minimum common-mode-component change rate between the positive clamping state and the negative clamping state, and a modulation curvature parameter of the three-phase converter;

calculate a modulation wave set corresponding to the initial three-phase modulation waves based on a preset maximum modulation-wave amplitude-limiting value, a preset minimum modulation-wave amplitude-limiting value, the initial three-phase modulation waves, and the common-mode-component change-rate adjustment coefficient;

select a common-mode modulation wave from the modulation wave set, wherein the common-mode modulation wave has a minimum absolute value; and perform waveform superposition on the initial three-phase modulation waves and the common-mode modulation wave to obtain output three-phase modulation waves.

7. The pulse width modulation system according to claim 6, wherein the one or more hardware processors execute the instructions to:

obtain the preset maximum modulation degree $M_{max}$, the preset minimum modulation degree $M_{min}$, the preset minimum common-mode-component change rate $K_b$ between the positive clamping state and the negative clamping state, the preset difference $K_a$ between the maximum common-mode-component change rate and the minimum common-mode-component change rate between the positive clamping state and the negative clamping state, and the modulation curvature parameter N of the three-phase converter, wherein N is greater than 0; and substitute $M_{max}$, $M_{min}$, $K_b$, $K_a$, N, and the converter modulation degree M into a formula $$K = K_a \times \left(\frac{M - M_{min}}{M_{max} - M_{min}}\right)^N + K_b$$

to calculate the common-mode-component change-rate adjustment coefficient K.

8. The pulse width modulation system according to claim 7, wherein the one or more hardware processors execute the instructions to:

obtain the preset maximum modulation-wave amplitude-limiting value $v_{max}$ and the preset minimum modulation-degree amplitude-limiting value $v_{min}$;

calculate a modulation wave set $\{v_{max} - v_a, K*(v_{max}/2 + v_{min}/2 - v_a), v_{min} - v_a\}$ corresponding to $v_a$ based on $v_{max}$, $v_{min}$, the common-mode-component change-rate adjustment coefficient K, and an initial first-phase modulation wave $v_a$ of the initial three-phase modulation waves, wherein $v_{max}-v_a$ is a modulation wave variable in a first positive clamping state corresponding to $v_a$, $v_{min}-v_a$ is a modulation wave variable in a first negative clamping state corresponding to $v_a$, and $K*(v_{max}/2+v_{min}/2-v_a)$ is a modulation wave variable in a switching state corresponding to $v_a$;

calculate a modulation wave set $\{v_{max}-v_b, K*(v_{max}/2+v_{min}/2-v_b), v_{min}-v_b\}$ corresponding to $v_b$ based on $v_{max}$, $v_{min}$, the common-mode-component change-rate adjustment coefficient K, and an initial second-phase modulation wave $v_b$ of the initial three-phase modulation waves, wherein $v_{max}-v_b$ is a modulation wave variable in a second positive clamping state corresponding to $v_b$, $v_{min}-v_b$ is a modulation wave variable in a second negative clamping state corresponding to $v_b$, and $K*(v_{max}/2+v_{min}/2-v_b)$ is a modulation wave variable in a switching state corresponding to $V_b$;

calculate a modulation wave set $\{v_{max}-v_c, K*(v_{max}/2+v_{min}/2-v_c), v_{min}-v_c\}$ corresponding to $v_c$ based on $v_{max}$, $v_{min}$, the common-mode-component change-rate adjustment coefficient K, and an initial second-phase modulation wave $v_c$ of the initial three-phase modulation waves, wherein $v_{max}-v_c$ is a modulation wave variable in a third positive clamping state corresponding to $v_c$, $v_{min}-v_c$ is a modulation wave variable in a third negative clamping state corresponding to $v_c$, and $K*(v_{max}/2+v_{min}/2-v_c)$ is a modulation wave variable in a switching state corresponding to $v_c$;

obtain the modulation wave set $\{v_{max}-v_a, v_{max}-v_b, v_{max}-v_c, K*(v_{max}/2+v_{min}/2-v_a), K*(v_{max}/2+v_{min}/2-v_b), K*(v_{max}/2+v_{min}/2-v_c), v_{min}-v_a, v_{min}-v_b, v_{min}-v_c\}$ corresponding to the initial three-phase modulation waves based on the modulation wave sets corresponding to $v_a$, $v_b$, and $v_c$; and calculate an absolute value of each modulation wave variable in the common-mode modulation wave set, and select a modulation wave variable having a minimum absolute value as the common-mode modulation wave.

9. The pulse width modulation system according to claim 6, wherein the one or more hardware processors execute the instructions to:

perform waveform superposition on an initial modulation wave of each phase of the initial three-phase modulation waves and the common-mode modulation wave in a one-to-one correspondence to obtain the output three-phase modulation waves.

10. The pulse width modulation system according to claim 9, wherein the one or more hardware processors execute the instructions to:

obtain three-phase grid voltages, three-phase currents, and a preset carrier amplitude value;

perform phase locking processing on the three-phase grid voltages to obtain a rotating coordinate system phase;

perform coordinate transformation on the three-phase currents based on the rotating coordinate system phase to obtain rotating coordinate system currents;

obtain a preset current reference value for coordinate transformation of the three-phase currents;

calculate differences between the preset current reference value and the rotating coordinate system currents to obtain current differences;

process the current differences by using proportional-integral PI regulators to obtain rotating coordinate system adjustment components;

perform inverse coordinate transformation on the rotating coordinate system adjustment components to obtain the initial three-phase modulation waves;

obtain a modulation-wave amplitude value of the initial three-phase modulation waves; and obtain the converter modulation degree based on a ratio of the modulation-wave amplitude value to the preset carrier amplitude value.

11. A controller, applied to a three-phase converter, and comprising:

a processor, a memory, and a signal interface connected to each other, wherein the memory stores an operation instruction of the processor;

the signal interface is configured to obtain initial three-phase modulation waves and a converter modulation degree;

the processor is configured to calculate a common-mode-component change-rate adjustment coefficient based on preset modulation parameters and the converter modulation degree, wherein the preset modulation parameters comprise a preset maximum modulation degree, a preset minimum modulation degree, a preset minimum common-mode-component change rate between a positive clamping state and a negative clamping state, a preset difference between a maximum common-mode-component change rate and the minimum common-mode-component change rate between the positive clamping state and the negative clamping state, and a modulation curvature parameter of the three-phase converter;

the processor is further configured to: calculate a modulation wave set corresponding to the initial three-phase modulation waves based on a preset maximum modulation-wave amplitude-limiting value, a preset minimum modulation-wave amplitude-limiting value, the initial three-phase modulation waves, and the common-mode-component change-rate adjustment coefficient;

the processor is further configured to: select a common-mode modulation wave from the modulation wave set, wherein the common-mode modulation wave has a minimum absolute value; and the processor is further configured to perform waveform superposition on the initial three-phase modulation waves and the common-mode modulation wave to obtain output three-phase modulation waves.

* * * * *

UNITED STATES PATENT AND TRADEMARK OFFICE
CERTIFICATE OF CORRECTION

PATENT NO. : 10,630,163 B2
APPLICATION NO. : 16/426171
DATED : April 21, 2020
INVENTOR(S) : Fangcheng Liu, Kai Xin and Haibin Guo It is certified that error appears in the above-identified patent and that said Letters Patent is hereby corrected as shown below:

In the Claims

In Column 29, Line 16, in Claim 3, delete "{$v_{max}$-va," and insert -- {$v_{max}$-$v_a$, --, therefor.

In Column 29, Line 17, in Claim 3, delete "$v_{max}$-v$v_c$," and insert -- $v_{max}$-$v_c$, --, therefor.

In Column 29, Line 17, in Claim 3, delete "$K*(v_{max}/2+v_{min}/2$-va)," and insert -- $K*(v_{max}/2+v_{min}/2-v_a)$, --, therefor.

In Column 29, Line 18, in Claim 3, delete "$K*(v_{max}/2+v_{min}/2-v_c)$," and insert -- $K*(v_{max}/2+v_{min}/2-v_c)$, --, therefor.

In Column 29, Line 18, in Claim 3, delete "$v_{min}$ -va," and insert -- $v_{min}$ -$v_a$, --, therefor.

In Column 31, Line 5, in Claim 8, delete "$K*(v_{max}/2+v_{min}/2-v_a)$" and insert -- $K*(v_{max}/2+v_{min}/2-v_a)$ --, therefor.

In Column 31, Line 17, in Claim 8, delete "$V_b$;" and insert -- $v_b$; --, therefor.

In Column 31, Line 19, in Claim 8, delete "$v_c$based" and insert -- $v_c$ based --, therefor.

In Column 31, Line 20, in Claim 8, delete "$v_{max}$ ," and insert -- $v_{max}$, --, therefor.

Signed and Sealed this
Twenty-third Day of June, 2020

Andrei Iancu
*Director of the United States Patent and Trademark Office*